United States Patent
Bellussi et al.

(10) Patent No.: US 12,012,204 B2
(45) Date of Patent: Jun. 18, 2024

(54) ROTOR FOR A HOVER-CAPABLE AIRCRAFT

(71) Applicants: LEONARDO S.P.A., Rome (IT); POLITECNICO DI MILANO, Milan (IT)

(72) Inventors: Enrico Bellussi, Samarate (IT); Massimo Brunetti, Samarate (IT); Giovanni Facchini, Samarate (IT); Nicola Ostuni, Samarate (IT); Francesco Castelli Dezza, Samarate (IT); Marco Mauri, Samarate (IT); Steven Chatterton, Samarate (IT); Nicola Toscani, Samarate (IT)

(73) Assignees: LEONARDO S.P.A., Rome (IT); POLITECNICO DI MILANO, Milan (IT)

( * ) Notice: Subject to any disclaimer, the term of this patent is extended or adjusted under 35 U.S.C. 154(b) by 169 days.

(21) Appl. No.: 17/789,871

(22) PCT Filed: Dec. 28, 2020

(86) PCT No.: PCT/IB2020/062480
§ 371 (c)(1),
(2) Date: Jun. 29, 2022

(87) PCT Pub. No.: WO2021/137131
PCT Pub. Date: Jul. 8, 2021

(65) Prior Publication Data
US 2023/0050072 A1 Feb. 16, 2023

(30) Foreign Application Priority Data
Dec. 30, 2019 (EP) .................................... 19219995

(51) Int. Cl.
*B64C 27/473* (2006.01)
*B64D 15/12* (2006.01)
(Continued)

(52) U.S. Cl.
CPC ............ *B64C 27/473* (2013.01); *B64D 15/12* (2013.01); *B64D 45/00* (2013.01); *F16C 19/06* (2013.01);
(Continued)

(58) Field of Classification Search
CPC ....... B64C 27/06; B64C 27/473; B64D 15/12; B64D 45/00; F16C 19/06; F16C 2326/43; H01F 21/04
See application file for complete search history.

(56) References Cited

U.S. PATENT DOCUMENTS 5,704,567 A * 1/1998 Maglieri ................ B64D 15/12
244/17.11
2002/0175152 A1* 11/2002 Petrenko .................. H02G 7/16
219/209
(Continued)

FOREIGN PATENT DOCUMENTS

DE 102016103270 B3 5/2017
EP 2919555 B1 11/2016

OTHER PUBLICATIONS

International Search Report and Written Opinion in corresponding International Patent Application No. PCT/IB2020/062480 dated Mar. 10, 2021 (18 pages).

*Primary Examiner* — Tye William Abell
(74) *Attorney, Agent, or Firm* — Leason Ellis LLP

(57) ABSTRACT

A rotor for an aircraft is described having: a support angularly fixed with respect to an axis and housing a power source; a unit rotatable about axis and housing an electrical load of the resistive type; and a power supply system for the
(Continued)

electrical load (21, 24) and comprising: a first transformer electrically interposed between the power source and the load; the first transformer comprises: a first winding arranged on the support and a second winding arranged on the unit, a stator carried by the support, rotationally fixed with respect to axis and to which the first winding is fixed; and a rotor operatively connected to the unit and to which the second winding is fixed; the power supply system comprises a capacitive circuit electrically connected to the first transformer, so as to reduce the reactive power absorbed by the rotary transformer.

44 Claims, 12 Drawing Sheets

(51) Int. Cl.
    *B64D 45/00*     (2006.01)
    *F16C 19/06*     (2006.01)
    *H01F 21/04*     (2006.01)
    *B64C 27/06*     (2006.01)

(52) U.S. Cl.
    CPC .............. *H01F 21/04* (2013.01); *B64C 27/06* (2013.01); *F16C 2326/43* (2013.01)

(56) References Cited

U.S. PATENT DOCUMENTS

2013/0101397 A1* 4/2013 De Wergifosse ......... H02P 9/46
                                                      310/67 R
2019/0329876 A1* 10/2019 Brunetti ................ B64C 27/605

* cited by examiner

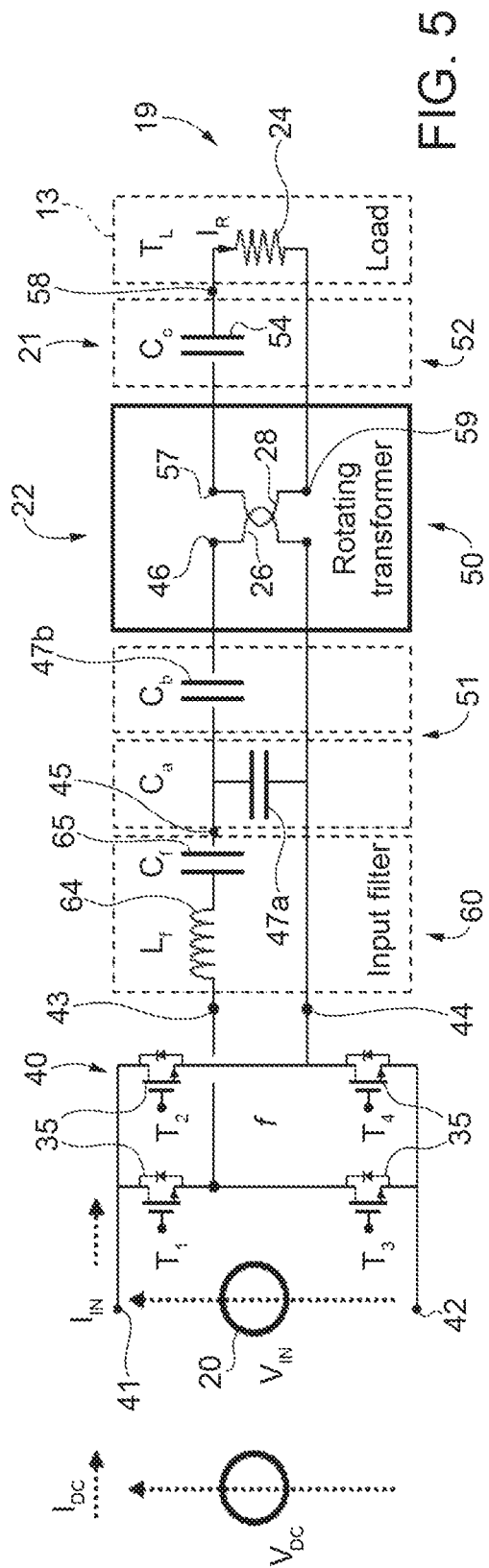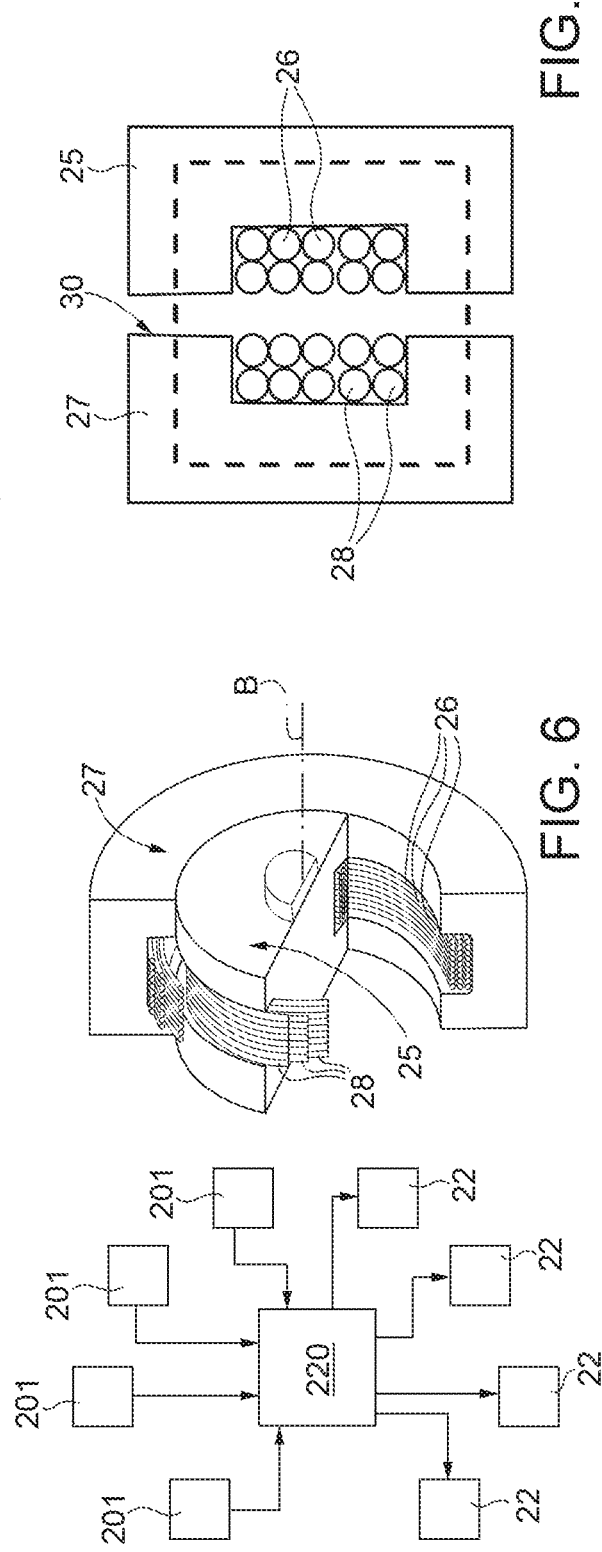

ROTOR FOR A HOVER-CAPABLE AIRCRAFT

CROSS-REFERENCE TO RELATED APPLICATIONS

This patent application is a U.S. National Phase Application under 35 U.S.C. § 371 of International Patent Application No. PCT/IB2020/062480, filed on Dec. 28, 2020, which claims priority from European patent application no. 19219995.8 filed on Dec. 30, 2019, the entire disclosure of which is incorporated herein by reference.

TECHNICAL FIELD

The present invention relates to a rotor for a hover-capable aircraft.

BACKGROUND ART

Helicopters of known type basically comprise:

a fuselage stretching along a longitudinal direction of extension of the helicopter;

a main rotor adapted to generate a resultant force on the helicopter having a first vertical component necessary for sustaining the helicopter in the air and a second component in a horizontal plane to enable the helicopter to advance along the longitudinal direction and in a lateral direction orthogonal thereto; and a tail rotor adapted to generate counter torque against the reaction torque transmitted by the main rotor to the fuselage and to consequently control the helicopter's yaw angle.

Helicopters of known type also comprise:

one or more drive turbines;

a main transmission unit that transmits motion from the turbine to the main rotor; and a secondary transmission unit that transmits motion from the main transmission unit to the tail rotor. The main rotor and the tail rotor each comprise:

a fixed casing;

a mast that is driven in rotation about its axis by the main or secondary transmission unit;

a hub drawn in rotation by the mast; and a plurality of blades that are hinged to the hub.

The main rotor or tail rotor also comprise a plurality of electrical loads arranged on rotating components, for example on the blades.

An example of these electrical loads is represented by the blades' anti-ice/de-icer system. This system is adapted to prevent the formation of ice and/or remove ice that forms on the blades following the adhesion and cooling of airborne water drops on the helicopter's blades in certain temperature and humidity conditions.

The formation of ice modifies the aerodynamic profile of the blades, causing vibrations to occur and dangerously reducing helicopter controllability.

Systems of known type comprise:

an electric generator carried on a fixed part of the helicopter;

a plurality of electrical resistances housed in the blades and adapted to generate, via the Joule effect, a sufficient amount of heat to remove the ice; and a rotating collector, known as a slip-ring, which transmits electrical energy from the generator to the rotating electrical resistances by creating a sliding contact between the stationary conductors electrically connected to the generator and the rotating conductors of the main or tail rotor.

Systems of known type also comprise:

a control unit; and a plurality of temperature sensors embedded within the blades and adapted to measure the effective temperature of the blades.

These sensors are formed by electrical conductors having a resistance that changes significantly with temperature.

If the temperature of the blades exceeds a predetermined value, the control unit reduces the power supplied to the electrical resistances, so as to reduce the risk of overheating the blades and subsequent structural damage.

Although working well, the previously described solutions of known type leave space for improvement.

In greater detail, the slip-ring entails complex manufacture and maintenance, and is easily subject to wear. This drawback is especially marked in the anti-torque rotors, which rotate at a higher speed than the main rotor. Due to this, it is necessary to frequently replace the slip-ring, even several times a year.

Known types of anti-ice/de-icer systems also represent an appreciable portion of the helicopter's weight and absorb a significant portion of turbine power during forward flight.

EP-B-2919555 describes a de-icer system for the propeller blades of an aircraft without a slip-ring.

The system described in this patent application basically comprises:

a resistive-inductive heating unit carried by the propeller blades; and a power transfer system configured to transfer electrical power from a stator part of the aircraft to the propeller blades without requiring sliding contact between the stator part and the propeller.

In greater detail, the heating unit is powered by electric current from the transfer system and generates a magnetic field. In turn, this magnetic field generates eddy currents that, due to the Joule effect, cause the blades to heat, which prevents the formation of/removes the ice on them.

In greater detail, the power transfer system comprises a rotary transformer.

The rotary transformer, in turn, comprises:

a primary winding coupled to the stator part, which can be supplied with an alternating electric current and is adapted generate a time-varying electromagnetic field; and a secondary winding rotatable about the stator part integrally with the blades and about the primary winding, electromagnetically coupled to the primary winding and adapted to generate the electric current to be made available to the heating unit.

The secondary winding is separated from the primary winding by an air gap.

Due to the presence of the primary and secondary windings, part of the power absorbed by the rotary transformer, known as reactive power, is used to excite the magnetic circuits associated with these primary and secondary windings.

This reactive power results in suboptimal operation of the rotary transformer and its overheating.

In fact, this reactive power can require an increase in the section of the cables, and/or cause a shortening of the useful life of the electrical components and/or a reduction in the efficiency of the power transfer system.

Furthermore, rotary transformers are usually heavy and bulky. This is because the power transferred is proportional, for the same geometry and material used, to the frequency of the alternating current that flows in the primary and secondary windings. This frequency takes a fixed value on board the aircraft.

There is awareness in the industry of the need to reduce the reactive power absorbed by the rotary transformer as far as possible.

There is also awareness in the industry of the need to reduce the weight and size of the rotary transformer, so as to make its application on an aircraft advantageous.

Finally, there is awareness in the industry of the need to reduce the self-heating effect of the temperature sensors, in order to improve the precision of measuring the temperature of the blades.

U.S. Pat. No. 5,704,567 and US-A-2002/175152 disclose a rotor for a hover-capable aircraft according to the preamble of claim 1.

US-A-2013/101397 discloses an apparatus including a fixed part, a rotary support configured to be driven in rotation relative to the fixed part, at least one item of electrical equipment carried by the rotary support, and a power supply device configured to supply electrical energy to the electrical equipment. The power supply device includes an asynchronous machine including a stator fixed to the fixed part and a rotor carried by the rotary support, and an excitation device. The stator includes an electrical circuit including at least one switch configured to switch between an open state in which the electrical circuit is open and a closed state in which the electrical circuit is closed. The rotor includes at least one winding connected to the electrical equipment. The excitation device is configured to provide a reactive current to the electrical circuit of the stator or to the winding of the rotor.

DE-B-102016103270 discloses a device and a method for holding, rotating, heating and/or cooling a substrate. The device comprises a rotor, having: at least one secondary winding, a substrate holder with a substrate holder surface and fixing elements for fixing the substrate, a rotary shaft for rotating the substrate holder around a rotary axis, at least one electric heater for heating and/or a cooler for cooling the substrate holder surface; and a stator, having: at least one primary winding, a ring-shaped base, wherein the rotary shaft of the rotor is arranged at least partially inside the base; and wherein a current and/or a voltage is induced in the at least one secondary winding by the at least one primary winding, the induced current and/or voltage used to power the at least one heater and/or cooler so that the substrate holder surface is heated and/or cooled.

DISCLOSURE OF INVENTION

The object of the present invention is to produce a rotor for a hover-capable aircraft that enables satisfying at least one of the above-specified needs in a simple and inexpensive manner.

The aforesaid object is achieved by the present invention, in so far as it relates to a rotor for a hover-capable aircraft as defined in claim 1.

BRIEF DESCRIPTION OF THE DRAWINGS

For a better understanding of the present invention, eight preferred embodiments are described hereinafter, purely by way of a non-limitative example and with reference to the accompanying drawings, in which:

FIG. 5 is a schematic view of a plurality of first electrical circuits of a first embodiment of the anti-ice/de-icer system of the helicopter in FIGS. 1 to 4;

FIG. 6 is an axonometric view of certain components of the rotor of the helicopter in FIGS. 1 to 6, with parts removed for the sake of clarity;

FIG. 7 is a schematized section view of the components in FIG. 6, with parts removed for the sake of clarity;

BEST MODE FOR CARRYING OUT THE INVENTION

Figure 1:
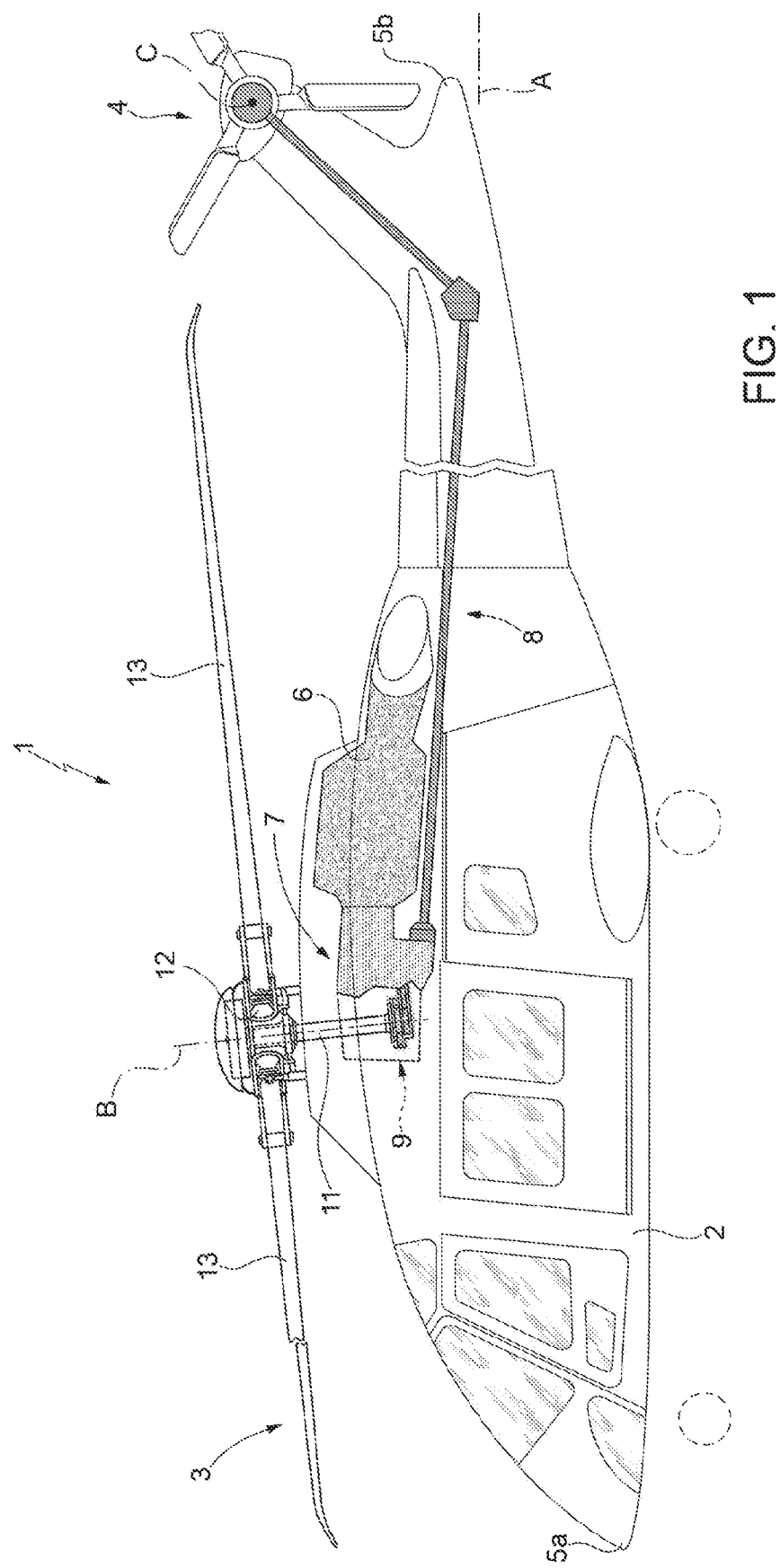
FIG. 1 is a side view of a helicopter with a rotor made according to the principles of the present invention.
Figure 2:
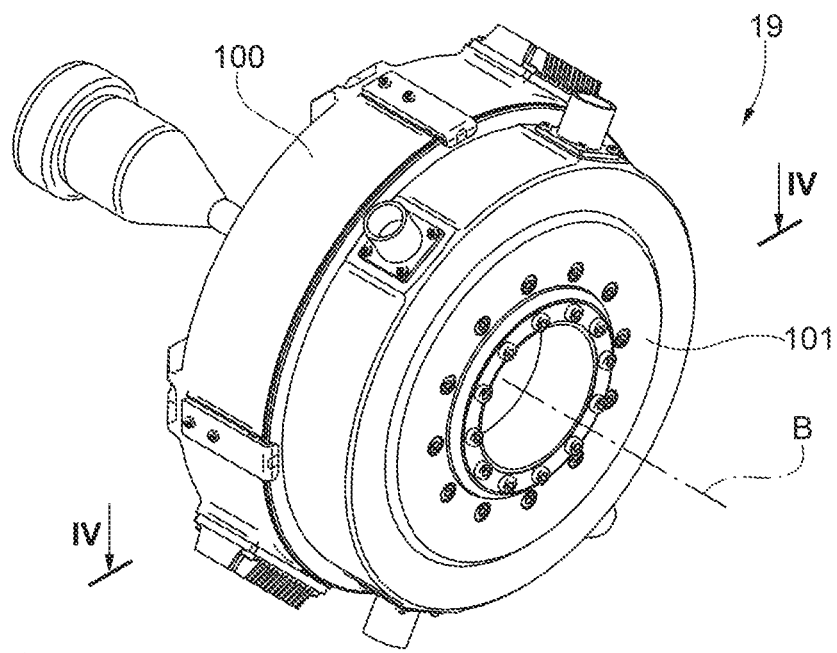
FIGS. 2 and 3 are perspective views from different viewing angles of certain components of a first embodiment of an anti-ice/de-icer system of the helicopter in FIG. 1, with parts removed for the sake of clarity.
Figure 3:
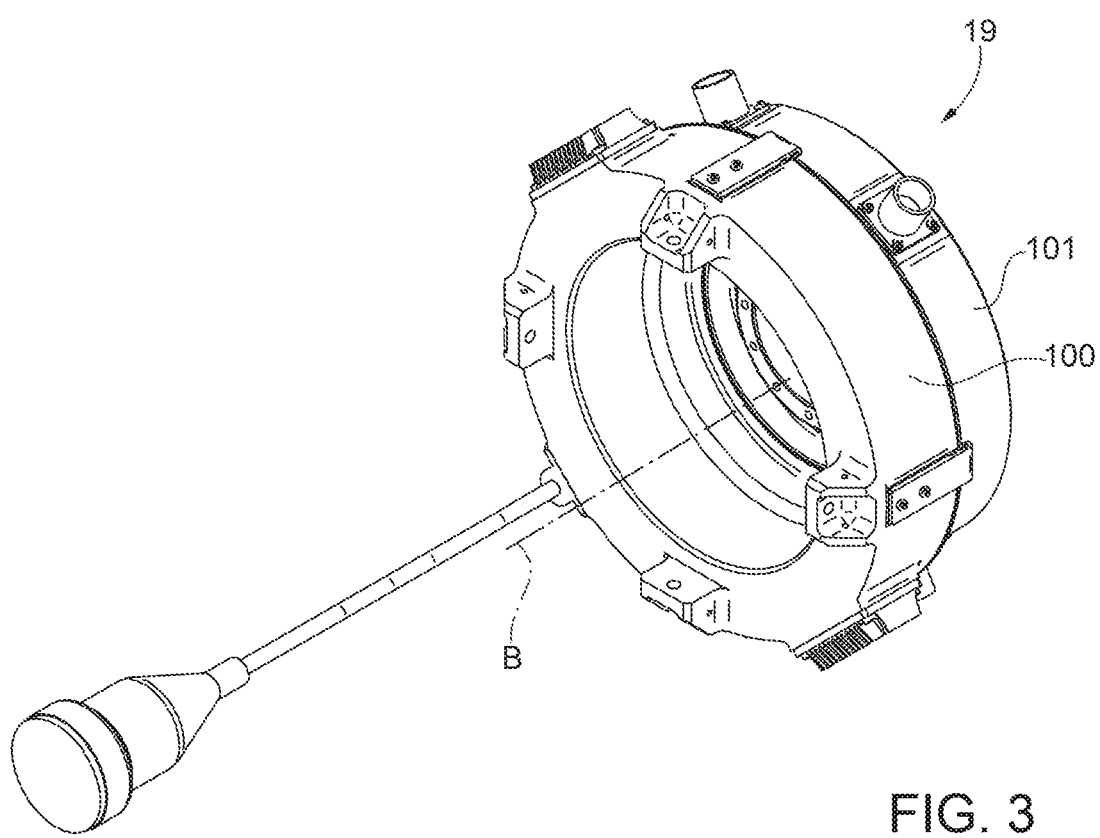

Referring to accompanying figures, reference numeral 1 indicatesa hover-capable aircraft, in particular a helicopter.

The helicopter 1 basically comprises (FIG. 1):

a fuselage 2 with a nose 5a and a tail 5b opposite to each other, and extending along a longitudinal axis A of the helicopter 1;

a main rotor 3 positioned on the top of the fuselage 2 and rotatable about an axis B; and an anti-torque rotor 4 supported by a fin positioned on the tail 5b of the helicopter 1.

In greater detail, the main rotor 3 provides the helicopter 1 with the necessary lift to sustain it in the air and the thrust necessary for forward flight of the helicopter 1 parallel to axis A and laterally thereto.

The anti-torque rotor 4 is rotatable about an axis C transversal to axes A and B, and exerts a force on the fin that produces torque about axis B on the fuselage 2. This torque is opposite to the reaction torque transmitted from the main rotor 3 to the fuselage 2 and enables controlling the yaw angle of the helicopter 1.

The helicopter 1 basically comprises:

two turbines 6 (only one of which is schematically shown);

a main transmission unit 7, which transmits motion from the turbines 6 to the main rotor 3; and an auxiliary transmission unit 8, which transmits motion from the main transmission unit 7 to the tail rotor 4.

Referring to FIG. 1, the rotor 3 basically comprises:

a casing 9 fixed to the fuselage 2 and angularly fixed with respect to axis B;

a mast 11, which is rotatable about axis B with respect to the casing 9;

a hub 12 angularly integral with the mast 11; and a plurality of blades 13, three in the case shown, hinged on the hub 12.

The rotor 3 also comprises an anti-ice/de-icer system 19, selectively activatable to heat the blades 13 and to prevent the formation of ice or remove any ice formations present on the blades 13.

In greater detail, the system 19 comprises (FIGS. 4 to 8):

an electrical power source 20 carried by the casing 9 and angularly fixed with respect to axis B;

a plurality of electrical circuits 21 integrally rotatable with the mast 11 and the blades 13 about axis B; and a plurality of rotary transformers 22, which are associated with respective blades 13 and are electrically interposed between the power source 20 and the associated electrical circuits 21.

Figure 4:
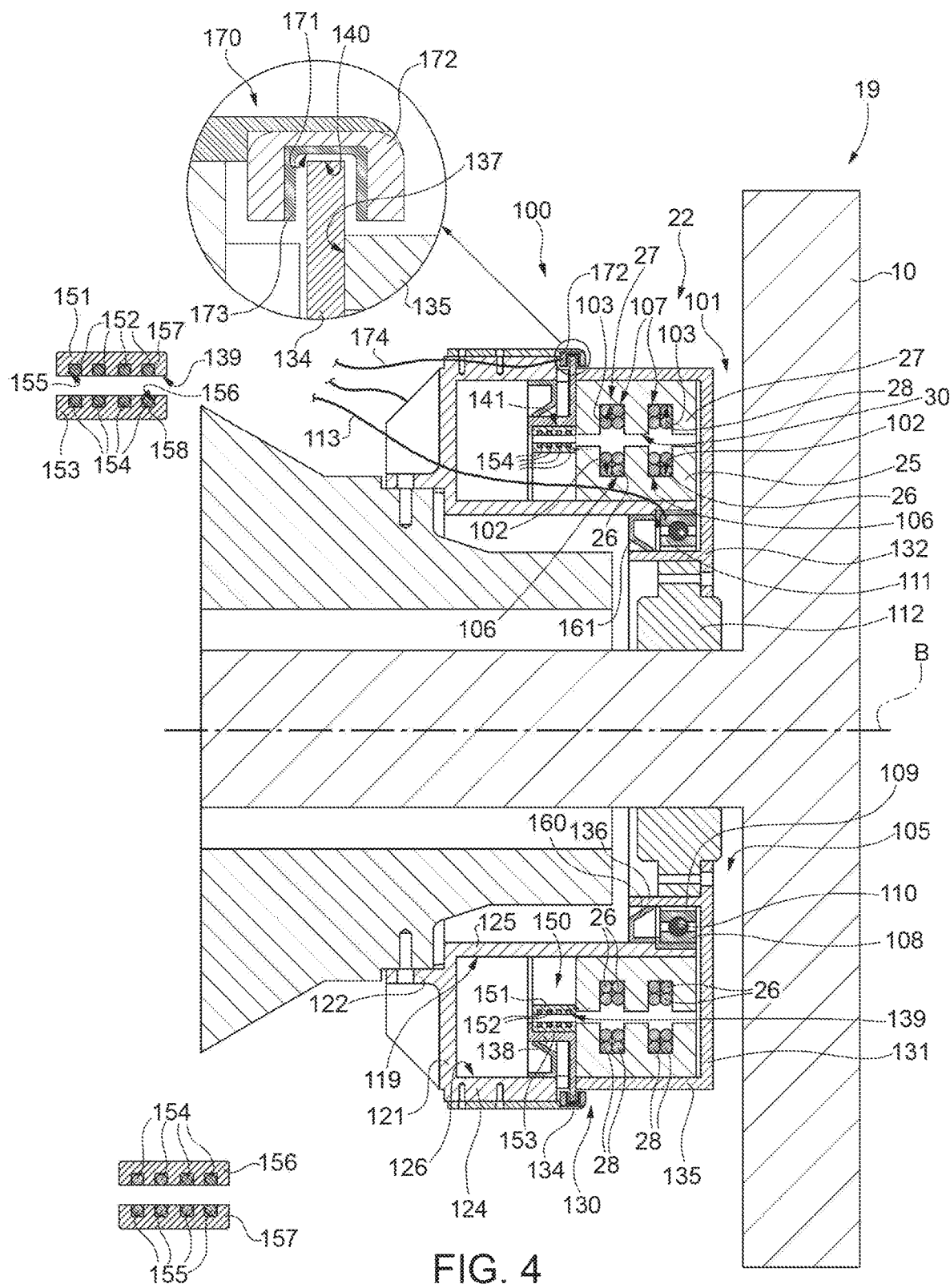
FIG. 4 is a section along line IV-IV in FIG. 2.

Referring to FIG. 4, each electrical circuit 21 is electrically powered by the respective rotary transformer 22.

Each electrical circuit 21 also comprises a respective resistor 24 embedded within the associated blade 13.

In particular, the resistors 24 are in series with each other.

The resistors 24 (FIG. 4) are adapted to have an electric current $I_R$ passing through them and to generate, via the Joule effect, a flow of heat towards the blades 13 that prevents the formation of ice or causes it to melt.

Each rotary transformer 22 comprises:

a primary winding 26, fixed with respect to axis B and electrically connected to the power source 20; and a secondary winding 28, electromagnetically coupled to the respective primary winding 26, and electrically connected to the respective electrical circuit 21 and the respective resistor 24.

The system 19 also comprises:

a half-core 25 carried by the casing 9, fixed with respect to axis B, and on which the primary windings 26 are wound; and a half-core 27 carried by the mast 11 and rotatable about axis B integrally with the mast 11 and the blades 13, and on which the secondary windings 28 are wound.

Each primary winding 24 is therefore associated with a respective secondary winding 26. The latter, in turn, is associated with a respective resistor 24 of a respective blade 13.

Since the half-cores 25, 27 are respectively carried by the casing 9 and the mast 11, each rotary transformer 22 comprises an associated air gap 30 interposed between the half-cores 25, 27.

The system 19 also comprises a plurality of driver circuits 40 (FIG. 5) of respective rotary transformers 22 and electrically interposed between the power source 20 and the rotary transformers 22.

In greater detail, the power source 20 is a direct voltage and direct current generator normally available on board the helicopter 1.

The power source 20 supplies a voltage $V_{DC}$ corresponding to the voltage normally available on board the helicopter 1.

The system 19 also comprises, for each driver circuit 40, a respective voltage reduction and stabilization stage, not shown in the accompanying figures and of known type, for example a Zener diode power supply stage.

The stabilization and reduction stage is electrically interposed between the power source 20 and the driver circuit 40.

In so far as it is necessary for the purposes of the present invention, each stabilization stage receives input power from the power source 20 with direct voltage $V_{DC}$ and provides a respective direct voltage $V_{IN}$ in output.

Each driver circuit 40 is an inverter, of the half-bridge type in the case shown.

Each driver circuit 40 is, in itself, known and not shown or described hereinafter, except for:

a pair of nodes 41, 42 electrically connected to the stabilization stage and powered by the latter with direct voltage $V_{IN}$; and a pair of nodes 43, 44 at the terminals of which a varying alternating voltage with a frequency f is made available.

Each driver circuit 40 also comprises a plurality of transistors 35 interposed between the nodes 41, 42 and 43, 44 and controllable so as to generate an alternating voltage at nodes 43, 44.

In the case shown, the transistors 35 of each driver circuit 40 are arranged between the nodes 41, 42, 43, 44 so as to create a full-bridge configuration.

Due to the presence of the transistors 35 and that the driver circuits 40 are inverters, the current Iin at node 41 alternates with frequency f.

Advantageously, the rotor 3 comprises, for each driver circuit 40 and the associated blade 13, a capacitive circuit 50 electrically connected to the respective rotary transformer 22, so as to reduce the reactive power absorbed by the respective rotary transformer 22.

In other words, each circuit 50 is associated with a respective driver circuit 40, a respective rotary transformer 22 and a respective blade 13.

In greater detail, the equivalent overall reactance of the load formed by each rotary transformer 22, by the respective resistor 24 and by the respective circuit 50 seen from the respective driver circuit 40 is substantially null.

In other words, the impedance of each aforementioned load is formed by:

a resistance defined by the respective resistor 24;

an equivalent reactance defined by the characteristic inductances of the respective primary windings 26 and secondary windings 28 and by the capacitances of circuit 50.

As is known, the equivalent reactance in an alternating voltage and current system depends on the frequency f.

The capacitance values of each circuit 50 are such as to cancel or reduce the equivalent reactance of the load at the respective value of frequency f.

In greater detail, each circuit 50 comprises:

a branch 51 electrically interposed between the driver circuit 40 and the primary winding 26 of the rotary transformer 22; and a branch 52 associated with a respective blade 13 and electrically interposed between the primary winding 28 and the respective resistor 24.

The rotor 3 also comprises a plurality of low-pass filters 60, each electrically interposed between the respective driver circuit 40 and branch 51 of the respective circuit 50.

Each filter 60, in turn, comprises an inductor 64 and a capacitor 65 electrically connected in series with node 43 and a node 45 of the respective driver circuit 40.

Branch 51 of each circuit 50, in turn, comprises:

a capacitor 47a electrically in series with nodes 45, 44; and a capacitor 47b electrically in series with the respective node 45 and a respective node 46.

The primary winding 26 is electrically in series with nodes 46, 44.

Each branch 52, in turn, comprises:

a respective node 57 and a respective node 58; and a respective capacitor 54 electrically in series with the respective nodes 57, 58.

Each resistor 24 is electrically in series between the respective node 58 and a respective node 59.

Each secondary winding 28 is electrically in series between the respective nodes 57, 59.

Figure 8:
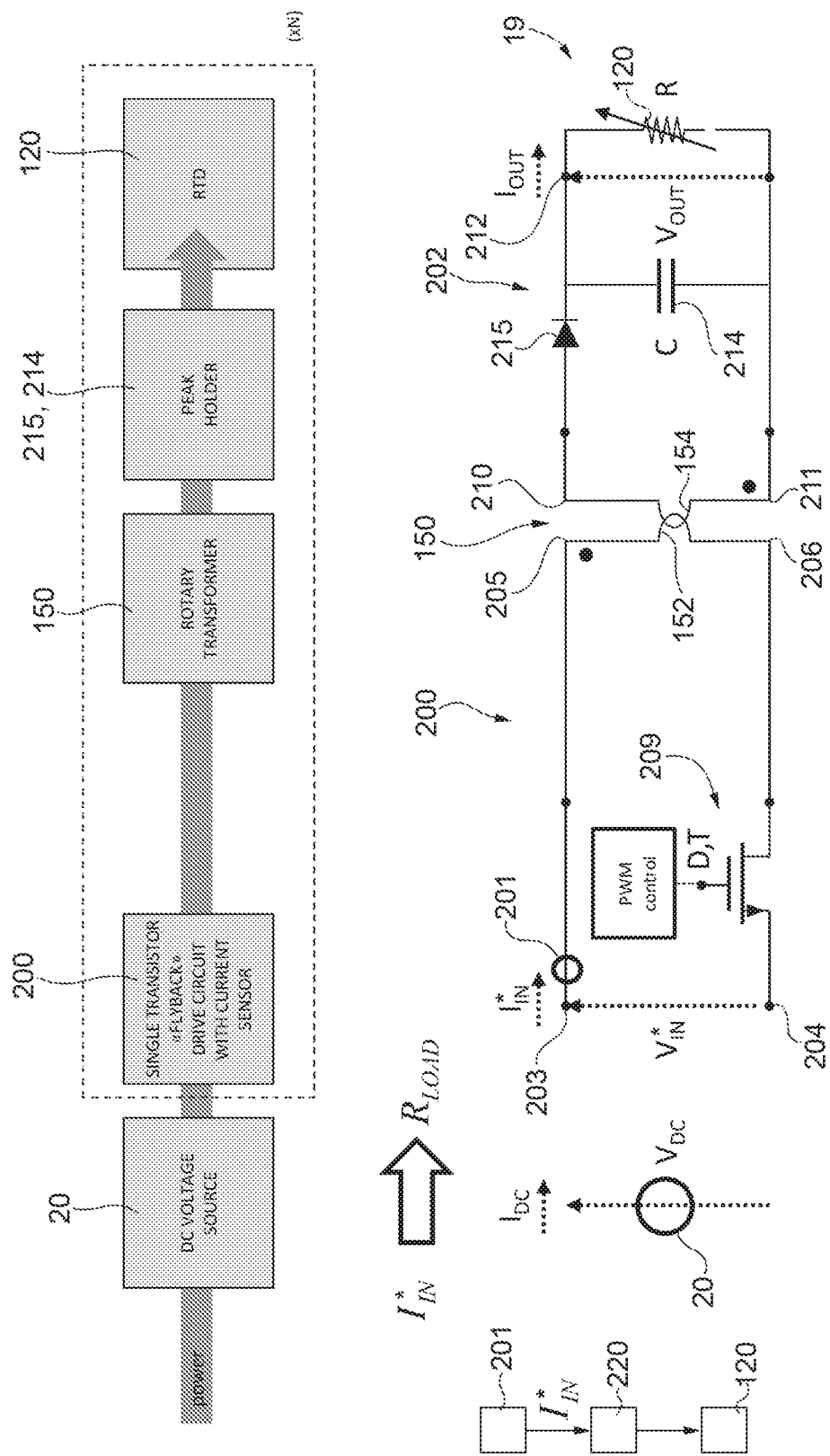
FIGS. 8 to 14 show respective embodiments of a second electrical circuit of the anti-ice/de-icer system of the rotor of the helicopter in FIGS. 2 to 4.

Referring to FIG. 8, the system 19 also comprises a plurality of temperature sensors 120, which are embedded within the respective blades 13 and are adapted to measure the temperature of the blades 13.

In particular, the sensors 120 are resistors made of a material of high resistivity, i.e. having respective resistance values that change significantly with temperature.

Each capacitor 54 and the respective resistor 24 is electrically interposed between node 60 and node 58. Referring to FIG. 6, the system 19 comprises a control unit 220 programmed to measure the temperature of the blades 13.

Preferably, the control unit 220 is programmed to consequently control the resistors 24, i.e. to increase or reduce the value of $I_R$ in order to regulate the anti-ice/de-icer function of the system 19.

In greater detail, the system 19 comprises (FIG. 8):

a plurality of driver circuits 200 on which respective current sensors 201 are provided and electrically connected to the power source 20;

a plurality of electrical power supply circuits 202 for respective sensors 120 carried by respective blades 13 and integrally rotatable about axis B; and a plurality of further rotary transformers 1, each of which is electrically interposed between respective circuits 200, 202.

Each circuit 200, the respective circuit 202 and the respective rotary transformer 150 are associated with a respective blade 13.

The system 19 also comprises a plurality of further voltage reduction and stabilization stages, not shown in the accompanying figures and of known type, for example, a Zener diode power supply and reduction stage.

Each stabilization and reduction stage is electrically interposed between the power source 20 and the respective driver circuit 200.

In so far as it is necessary for the purposes of the present invention, each further stabilization stage receives input power from the power source 20 with direct voltage $V_{DC}$ and provides a respective direct voltage $V^*_{IN}$ in output, available at the respective driver circuit 200.

Each circuit 200 is adapted to convert the direct voltage $V^*_{IN}$ supplied by the power source 20 into an alternating voltage with which the respective transformer 150 is powered.

Each transformer 150 comprises a respective primary winding 152 carried by the stator 100 and a respective secondary winding 154 carried by the respective blade 13.

Each circuit 200 comprises:

a pair of nodes 203, 204 electrically powered with direct voltage $V^*_{IN}$; and a pair of nodes 205, 206 between which the respective primary winding 152 is electrically connected in series.

Each circuit 200 also comprises a single transistor 209 connected in series with the respective nodes 204, 206. In particular, the transistor 209 is driven with constant pulse-width modulation.

Each circuit 200 implements a respective power supply inverter of the respective primary winding 152, i.e. it makes an alternating supply voltage of the respective primary winding 152 available at the respective nodes 205, 206.

The sensor 201 of each circuit 200 is electrically connected in series between the nodes 203, 205 and measures the respective current $I^*_{IN}$ that flows between the aforementioned respective nodes 203, 205 after the application of voltage $V_{DC}$.

Each electrical circuit 202 comprises:

a pair of respective nodes 210, 211, between which the secondary winding 154 is connected in series; and a respective node 212.

The sensor 120 of each electrical circuit 202 is electrically connected in series between the nodes 212, 211.

Each electrical circuit 202 also comprises:

a respective capacitor 214 electrically connected in series between the respective nodes 212, 211; and a respective diode 215 electrically connected in series between the nodes 210, 212.

In particular, the diode 215 of each circuit 202 conducts (blocks) during the opening (closing) phase of the transistor 209, consequently regulating the influx of electric current to the capacitor 214 and hence to the respective resistor 124.

The diode 215 and the capacitor 214 enable containing the voltage peaks in the respective circuit 202.

Referring to FIG. 8, the electric current that flows through each sensor 120 is indicated as $I_{OUT}$ and the voltage at the terminals of each capacitor 124 and respective sensor 120 is indicated as $V_{OUT}$.

The control unit 220 is programmed to compute the resistance value of the sensors 120, and therefore the temperature value of the respective blades 13, on the basis of the respective currents Iin that flow in the respective circuits 202, during the charging phase of the rotary transformer 150.

More specifically, the control unit 220 is programmed to estimate the resistance of the sensors 120 on the basis of the waveforms of the respective currents $I^*_{IN}$ or on the basis of the power absorbed from the power source 120.

Referring to FIG. 4, the rotary transformer 22 comprises:

a stator 100 angularly fixed with respect to axis B and connected to the casing 9; and a rotor 101 rotatable about axis B integrally with the mast 11 and operatively connected to the mast 11.

In particular, the rotor 101 is fixed to the mast 11 by a locking element 112 adapted to apply a compression force on the mast 11.

In the case shown, the stator 100 and the rotor 101 are coaxial with one another and with respect to axis B and support means (not shown) are provided, for example rolling-contact or friction bearings, interposed between the stator 100 and the rotor 101 in order to ensure coaxiality between stator 100 and rotor 101.

The stator 100 and the rotor 101 comprise the respective half-cores 25, 27 forming an annular shape around axis B and separated by the air gap 30.

The air gap 30 is annular around axis B.

In the embodiment shown, half-core 25 is arranged, at least in part, inside half-core 27.

The half-cores 25, 27 have respective prismatic slots 102, 103 facing each other radially to axis B.

The slots 102, 103 respectively house a plurality of primary windings 26 and a plurality of secondary windings 28 associated with respective blades 13.

In the case shown, there are four primary windings 26 and four secondary windings 28.

Each secondary winding 28 is associated with a respective sensor 120 and each primary winding 26 is electromagnetically coupled to a respective secondary winding 28.

In particular, slots 102 are open on the side radially opposite to axis B.

Slots 103 are radially open towards axis B.

The slots 102, 103 face each other so as to have the respective open ends 106, 107 radially aligned with each other.

In the case shown, half-core 25 comprises two slots 102 and half-core 27 comprises two slots 103.

In particular, the slots 102 (103) are axially aligned and form two units axially set apart from each other.

The rotary transformer 22 also comprises a non-rotating rolling-contact bearing 105 carried by the stator 100 and radially set apart from the rotor 101.

The rolling-contact bearing 105 defines a safety member adapted to prevent friction between stator 100 and rotor 101, in the event of deformation of or damage to the rotor 101.

In greater detail, the stator 100 comprises:
a hollow main body 119;
a top surface 121 shaped like a circular crown, having an extension orthogonal to axis B and defining a closed axial end of the stator 100; and
an appendage 122 projecting from the top surface 121 in an axial direction and fixed to the casing 9.

More specifically, the main body 119 is open on the side opposite to the top surface 121.

The main body 119 also comprises two walls 124, 125 extending axially and projecting in a cantilever fashion from the top surface 121 on the side opposite to the appendage 122.

The walls 124, 125 are radially set apart from the each other and, together with the appendage 122, define a volume 126 housing the control unit 220 (not shown) of the rotary transformer 22.

The rotor 101, in turn, comprises:
a hollow main body 130 partially housed in the main body 119 of the stator 100; and
a top surface 131 shaped like a circular crown, having an extension substantially orthogonal to axis B and defining a closed end of the main body 130.

In particular, main body 130 is open on the side of main body 119 and closed, by the top surface 131, on the side axially opposite to main body 119.

Main body 130 also comprises:
a wall 135 extending axially and projecting in a cantilever fashion from the top surface 131, and defining a radially outer end of the rotor 101;
a wall 136 extending axially, projecting in a cantilever fashion from the top surface 131 and radially internal with respect to wall 135.

In particular, wall 135 has an axial extension longer than the axial extension of wall 136.

Wall 125 is radially interposed between walls 126, 136.

The top surfaces 121, 131 are axially opposed to each other.

Top surface 131 is fixed to the locking element 112 at its own radially inner end 132.

The main body 130 also comprises:
a wall 134 extending radially and projecting in a cantilever fashion from a free axial end 137 of wall 135; and
a wall 138 extending axially and projecting in a cantilever fashion from wall 134 on the side opposite to the top surface 131.

More specifically, wall 134 comprises:
a radially outer end 140; and
a radially inner end 141 opposite to end 140 of wall 138.

End 140 is arranged radially external with respect to wall 135 and end 141 is arranged radially internal with respect to wall 135.

End 140 of wall 134 is axially facing wall 124.

Wall 138 is radially interposed between walls 135, 125.

Half-cores 25 are fixed to wall 125 of the stator 100.
Half-cores 27 are fixed to wall 135 of the rotor 101.

In particular, the half-cores 25, 27 are formed by a plurality of C-shaped ferrite modules. The modules lie on respective planes orthogonal to axis B (FIG. 6).

Referring to FIG. 4, each rotary transformer 150 basically comprises:
a respective half-core 151 carried by the stator 100 and fixed with respect to axis B;

a respective primary winding 152 wound on half-core 151, fixed with respect to axis B and electrically connected to the respective electrical circuit 200;
a respective half-core 153 carried by the mast 11 and rotatable about axis B integrally with the mast 11 and the blades 13; and
the respective secondary winding 154 wound on half-core 153, electromagnetically coupled to the respective primary winding 152 and electrically connected to the respective electrical circuit 202.

The half-cores 151, 153 have an annular shape around axis B.

The half-cores 151, 153 are separated by an air gap 139, which is also annular around axis B.

In the embodiment shown, half-core 151 is arranged outside half-core 153.

Similarly to half-cores 25, 27, half-cores 151, 153 have respective prismatic slots 155, 156 facing one another radially to axis B.

The slots 155, 156 house the respective primary windings 152 and the respective secondary windings 154.

In particular, the slots 155, 156 face each other so as to have the respective open ends 157, 158 aligned with each other.

Magnetic half-core 152 is fixed to wall 138.
Magnetic half-core 151 is fixed to half-core 27 in a position radially facing magnetic half-core 152.

Windings 152, 154, the respective slots 155, 156 and half-cores 151, 153 have smaller dimensions than the corresponding windings 26, 28, slots 102, 103 and half-cores 25, 27.

The rotor 3 also comprises:
a seal 160 radially interposed between a radially outer surface of wall 136 of the rotor 101 and a radially inner surface of wall 125 of the stator 100; and
a seal 161 radially interposed between a radially inner surface of wall 124 of the stator 100 and a radially outer surface of wall 138 of the rotor 101.

The seals 160, 161 are adapted to prevent contaminating substances damaging the primary windings 26 and secondary windings 28 of the rotary transformers 22.

In the case shown, seal 161 is radially internal with respect to seal 160.

The bearing 105 comprises, in particular:
a radially outer ring 108 fixed to wall 125 of the stator 100;
a radially inner ring 109 separated by a radial clearance from wall 136 of the rotor 101; and
a plurality of rolling bodies 110, which roll on the rings 108, 109.

The bearing 105 and the seal 160 are axially adjacent to each other.

In conditions of correct positioning of the rotor 101 in a radial direction to axis B, the bearing 105 is electrically insulated from the stator 100 by an insulating ring 111 applied on ring 108.

In the event of radial contact between wall 136 of the rotor 101 and ring 109 of the bearing 105, the bearing 105 becomes electrically connected to the stator 100 via the rotor 101.

More specifically, the system 109 comprises an electrical circuit 113 (only schematically shown in FIG. 4) electrically connected to ring 109 and to the stator 100.

This electrical circuit 113 is electrically open when the stator 100 and the rotor 101 are radially set apart and becomes electrically closed in the event of radial contact between the stator 100 and the rotor 101.

The rotor 3 also comprises a plurality of stop devices 170 (only one of which is shown in FIG. 4) adapted to stop the axial translation of the rotor 101 in the event of damage to the locking element 112.

In this way, the sliding of the rotor 101, which could cause impact against sensitive parts of the rotor 3, for example the control unit 220, and the consequent damaging thereof, is avoided.

In greater detail, the stop device 170 comprises a C-shaped seat 171 defined by a free axial end 172 of wall 124.

When the rotor 101 is correctly connected to the mast 11 and correctly positioned with respect to the stator 100 parallel to axis B, seat 171 is engaged with axial play by end 140 of wall 134.

When the rotor 101 is free to axially slide parallel axis B, due to a failure of the locking element 112, end 140 touches seat 171.

Seat 171 houses:
an element 172 made of an electrically insulating material; and
an electrical contact 173 made of an electrically conductive material, housed inside element 172 and electrically connected to an electrical signalling circuit 174 (only schematically shown in FIG. 4).

This electrical circuit 174 is electrically open when end 140 is axially set apart from the seat 171 and becomes electrically closed when end 140 axially touches the seat 171, thereby allowing the axial movement of the rotor 101 to be promptly signalled.

It is important to underline that FIG. 4 shows a system 19 adapted to prevent the formation of ice/remove ice for a rotor 3 with four blades 13.

For an expert in the field, it is evident that in the case where the rotor 3 has three blades, the system 19 provides three rotary transformers 22 and three respective circuits 202.

In use, the turbines 6 drive the main rotor 3 and the anti-torque rotor 4 in rotation.

Referring to rotor 3, the turbines 6 drive the mast 11 and the blades 13 in rotation about axis B. Contrariwise, the casing 9 remains angularly fixed with respect to axis B.

The system 19, through the resistors 24, enables preventing the formation of ice/removing ice that forms on the blades 13 following the adhesion and cooling of airborne water drops on the blades 13.

The system 19, through the sensors 120, also enables monitoring the temperature of the blades 13 and opportunely controlling the resistors 24 in order to avoid excessive overheating of the blades 13.

In greater detail, the system 19 electrically feeds the resistors 24 via the respective rotary transformers 22.

More specifically, the power source 20 provides a direct voltage $V_{DC}$ and electrically feeds the driver circuit 40 via the reduction/stabilization stage.

More precisely, a direct voltage Vin is supplied to nodes 41, 42 of the driver circuit 40.

The driver circuit 40 converts the direct voltage $V_{IN}$ supplied at nodes 41, 42 by the power source 20 into an alternating voltage with frequency f made available at nodes 43, 44.

Since the driver circuit 40 is an inverter, the electric current Iin at node 41 is alternating.

In particular, the driver circuit 40 stores magnetic energy in the primary windings 26 during the closing phase of the transistors 35, and then transfers it to the resistors 24 during the opening phase of the transistors 35.

In particular, in the case shown, the driver circuit 40 and the respective circuits 50 form a plurality of fly-back converters.

The alternating voltage available at nodes 45, 44 feeds branch 51 of the capacitive circuit and the primary windings 26 of the respective rotary transformers 22.

The rotary transformers 22 transfer, by electromagnetic induction, the alternating voltage at the same frequency f from the primary windings 26, stationary with respect to axis B, to the respective secondary windings 28, rotating with respect to axis B and carried by the respective blades 13.

The alternating voltage at the terminals of each secondary winding 28 electrically powers branch 52 of the respective circuit 50 and the respective resistor 24.

The capacitors 47a, 47b of branch 51 and capacitor 54 of branch 52 generate a reactive load on the driver circuit 40 and decrease the equivalent reactance of the impedance of this load, reducing the amount of reactive power dissipated by the system 19.

In the case where the rotor 101 is correctly positioned with respect to the stator 100, rings 108, 109 are normally angularly stationary with respect to axis B.

In this condition, wall 136 of the rotor 101 remains radially set apart from ring 109 of the bearing 105.

Furthermore, due to the presence of the insulating ring 111, the electrical circuit 113 remains electrically open in the aforementioned conditions.

Contrariwise, if wall 136 of the rotor 101 touches ring 109 of the bearing 105, ring 109 rotates integrally with wall 136, causing rotation of the rolling bodies 110 and avoiding relative scraping between rotor 101 and stator 100.

Following radial contact between wall 136 and ring 109, electrical circuit 113 becomes electrically closed, allowing this potential failure condition to be signalled.

When the rotor 101 is correctly connected to the mast 11 and correctly positioned with respect to the stator 100, the seat 171 of the stop device 170 is axially set apart from end 140 of wall 134.

Contrariwise, when the rotor 101 is free to axially slide parallel to axis B, for example due to a failure of the locking element 112, end 140 axially touches seat 171.

Furthermore, due to the presence of the element 172 of insulating material, the electrical circuit 174 remains electrically open in the aforementioned conditions.

Contrariwise, when end 140 axially touches the seat 171, electrical circuit 174 closes, allowing the potential failure condition to be signalled.

Referring to FIG. 8, the power source 20 also electrically feeds the driver circuits 200, which convert the direct voltage $V_{DC}$ of the power source 20 into an alternating voltage made available at the respective primary windings 152 of the respective rotary transformers 150.

In particular, the power source 20 feeds the stabilization/reduction stages with respective direct voltages $V_{DC}$. The stabilization/reduction stages provide respective direct voltages $V^*_{IN}$ in output at nodes 203, 204 of the respective driver circuits 200.

The transistor 209 of each driver circuit 200 is driven with constant pulse-width modulation by the control unit 220, i.e. maintaining a constant duty-cycle. The term duty-cycle means the ratio between the conduction time of the transistor 209 and the total time of conduction and non-conduction of the transistor 209, i.e. the period of the control signal.

More specifically, the rotary transformers 150 transfer, by electromagnetic induction, the alternating voltage at the same frequency f from the primary windings 152 to the respective secondary windings 154 carried by the respective blades 13.

The alternating voltage at the terminals of each secondary winding 154 electrically powers the respective circuit 202 and the corresponding sensor 120.

In particular, the driver circuits 200 stores magnetic energy in the primary windings 152 during the closing phase of the transistors 209, and then transfers it to the resistors 24 during the opening phase of the transistors 209.

In this way, each driver circuit 200 and the respective circuit 202 form a respective fly-back converter.

The duty-cycles of the transistors 209 are feedback controlled to provide constant power to the sensors 120.

In greater detail, the system 19 comprises, for each transistor 209, a feedback control loop (not shown in FIG. 8) that controls the duty-cycle of the transistor 209 on the basis of the error between the power (supply) of the respective sensor 120 and the target power (supply). In particular, the duty-cycles of the transistors 209 are controlled so as to transfer a constant active power value to the respective sensors 120, independently of the temperature of the sensors 120. In this way, it is possible to limit the measurement error due to temperature increases of the sensors 120, as the increase in temperature of the sensors 120 introduces a measurement error that is constant over time.

The diode 215 of each electrical circuit 202 prevents the respective capacitor 214 from discharging on the respective secondary winding 154.

The sensors 201 measure the time-varying currents $I^*_{IN}$ that flow between nodes 203, 205.

The control unit 220 is operatively connected to sensors 201 and is programmed to compute the resistances of sensors 120, based on the measurement of the currents $I^*_{IN}$ and the respective time trends.

In a first embodiment, the resistances of the sensors 120 are computed on the basis of the ramp of the respective currents $I^*_{IN}$ during the charging phase of the respective primary windings 152. The control unit 220 is programmed to sample this ramp in order to compute the resistance values of the sensors 120.

In a further embodiment, the resistances of the sensors 120 are computed on the basis of the active power values absorbed by the respective electrical circuits 200, 202. As the sensors 120 are substantially the only dissipative elements powered by the electrical circuits 200, 202, the power absorbed by the sensors 120 coincides with the mean power input to the electrical circuits 200, In particular, the power absorbed by the sensors 120 is inversely proportional to the resistances of the sensors 120.

Alternatively, the control unit 220 has a table stored in memory that correlates the mean value of the currents $I^*_{IN}$ to the temperature value of the respective sensors 120.

If the temperature of the blades 13 exceeds a threshold value, the transistors 35 of the driver circuit 40 are controlled so as to reduce the electrical power transmitted to the rotary transformers 22, thereby also reducing the power dissipated by resistors 24 via the Joule effect.

Figure 9:
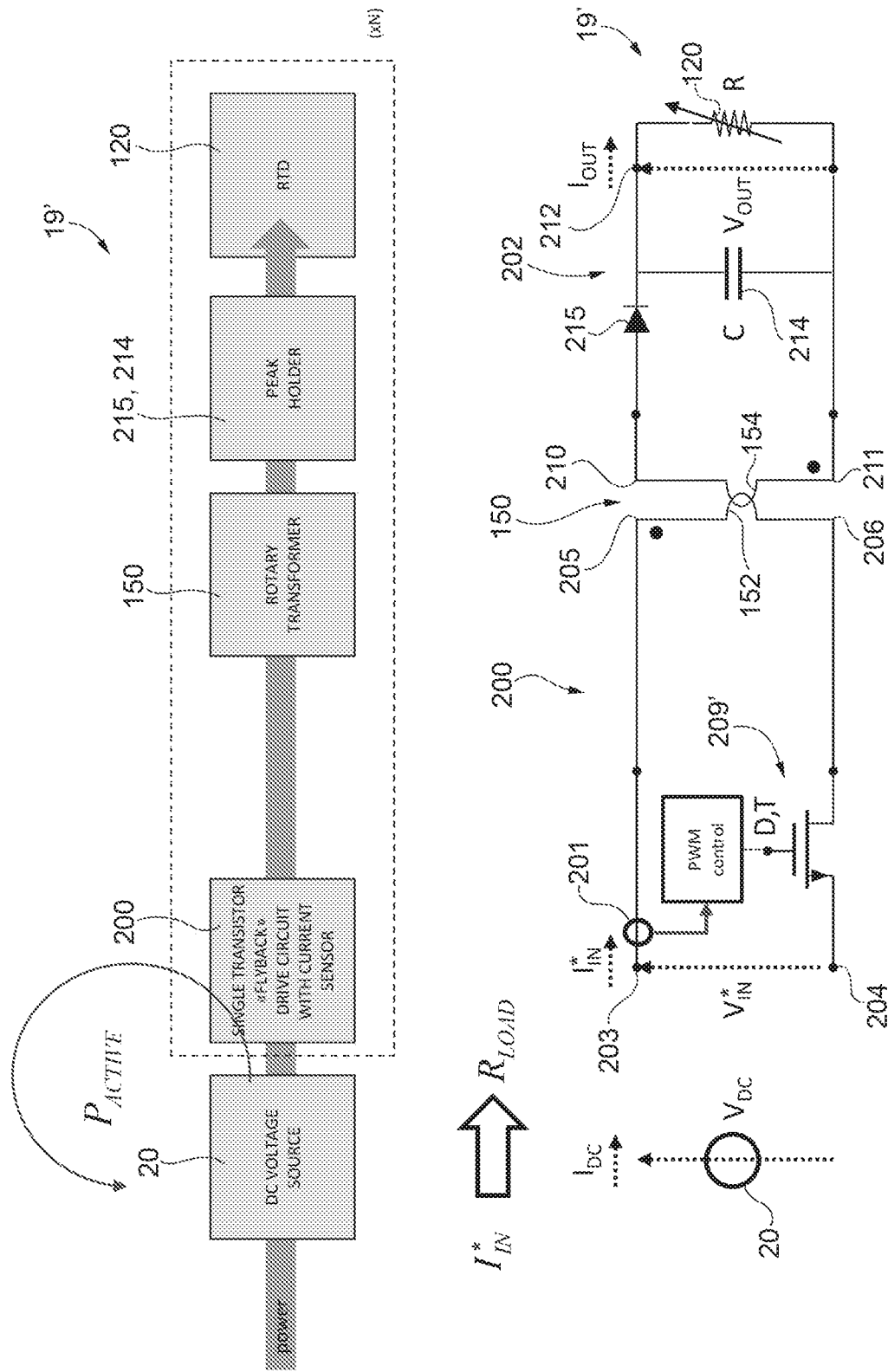

Referring to FIG. 9, reference numeral 19' indicates a system according to a further embodiment of the invention.

System 19' is similar to system 19 and will hereinafter be described only with regard to what differentiates it from the latter; the same or equivalent parts of the systems 19, 19' will be indicated, where possible, by the same reference numerals.

In particular, system 19' differs from system 19 in that the single transistor 209' of each circuit 200' is adaptively variable pulse-width modulated.

More specifically, the duty-cycle of each transistor 209' depends on the error between a target value of power transferred to the respective sensor 120 and an effective value of mean power transferred to the respective sensor 120 estimated as the product of the respective voltage $V^*_{IN}$ and the mean value of the respective current $I^*_{IN}$.

The target value corresponds to the mean power value that, if maintained, avoids overheating the sensors 124 and/or the occurrence of a false temperature signal (drift) associated with the blades 13.

The operation of system 19' is similar to that of system 19 and is therefore not described in detail.

Figure 10:
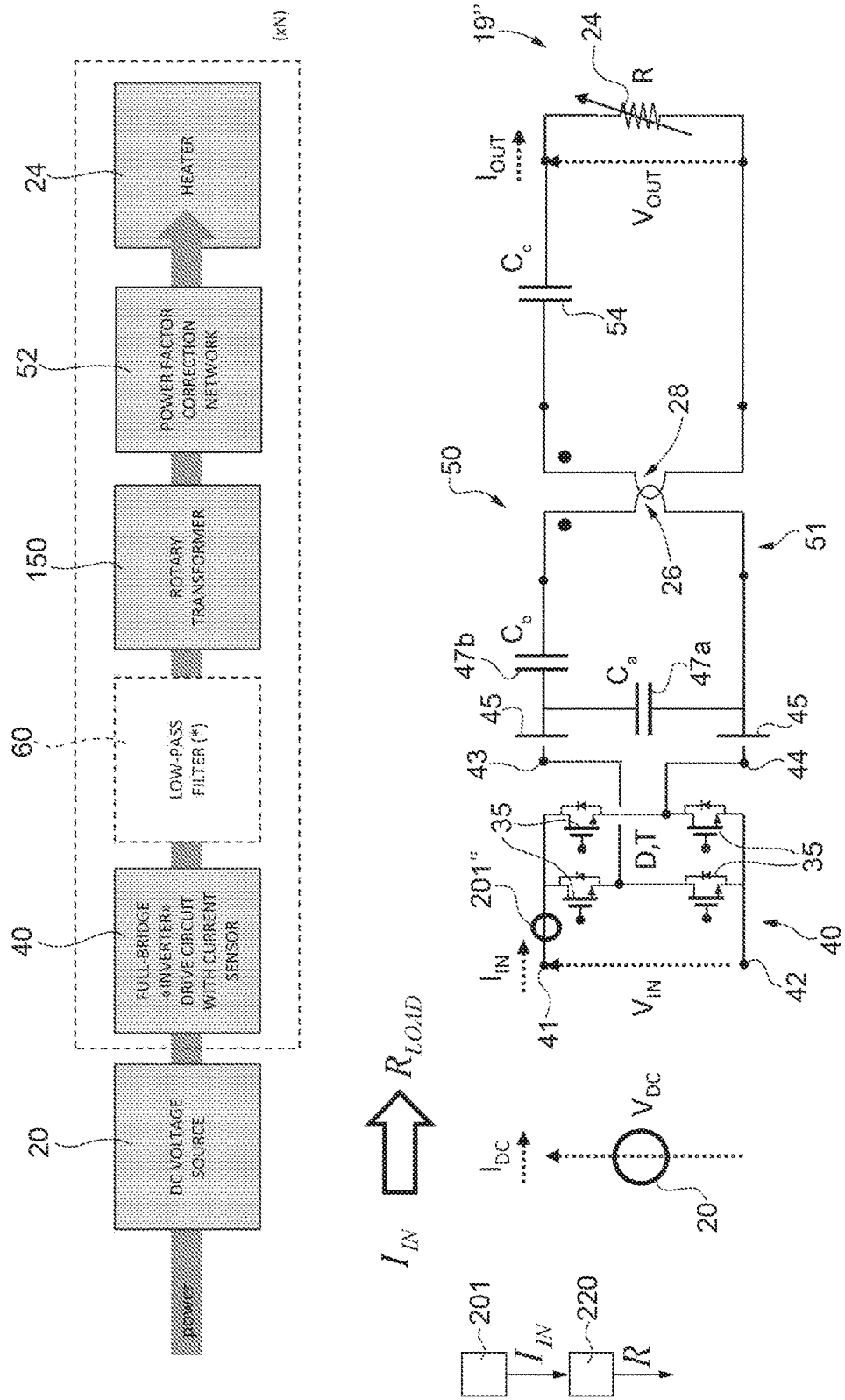

Referring to FIG. 10, reference numeral 19" indicates a system according to a further embodiment of the invention. System 19" is similar to system 19 and will hereinafter be described only with regard to what differentiates it from the latter; the same or equivalent parts of the systems 19, 19" will be indicated, where possible, by the same reference numerals.

In particular, system 19" differs from system 19 in that it does not comprise the rotary transformers 150 and the sensors 120.

System 19" also differs from system 19 in that the resistors 24 are configured as resistors with high resistivity and also act as temperature sensors for the respective blades 13.

System 19" also differs from system 19 in that the control unit 220 is programmed to estimate the temperature of the blades 13 by measuring the resistances of the respective resistors 24.

System 19" also differs from system 19 in that each driver circuit 40 comprises a respective sensor 201" connected in series with the respective node 41 and adapted to generate a resistance measurement of the respective resistor 24, and consequently of the temperature of the respective blade 13.

In greater detail, the control unit 220 is programmed to compute the resistances of the resistors 24 on the basis of measurement of the respective currents Iin supplied by the respective sensors 201.

More specifically, the control unit 220 is programmed to compute the resistance values of the resistors 24 on the basis of the waveforms of the respective currents $I_{IN}$ that flow in the respective nodes 41 of the respective driver circuits 40, or of the active power at node 41 estimated as the product of the direct voltage $V_{IN}$ and the mean value of the alternating current $I_{IN}$, as already described with reference to the embodiment in FIG. 8.

The operation of system 19" differs from that of system 19 in that the resistors 24 also perform the function of temperature sensors of the respective blades 13.

Figure 11:
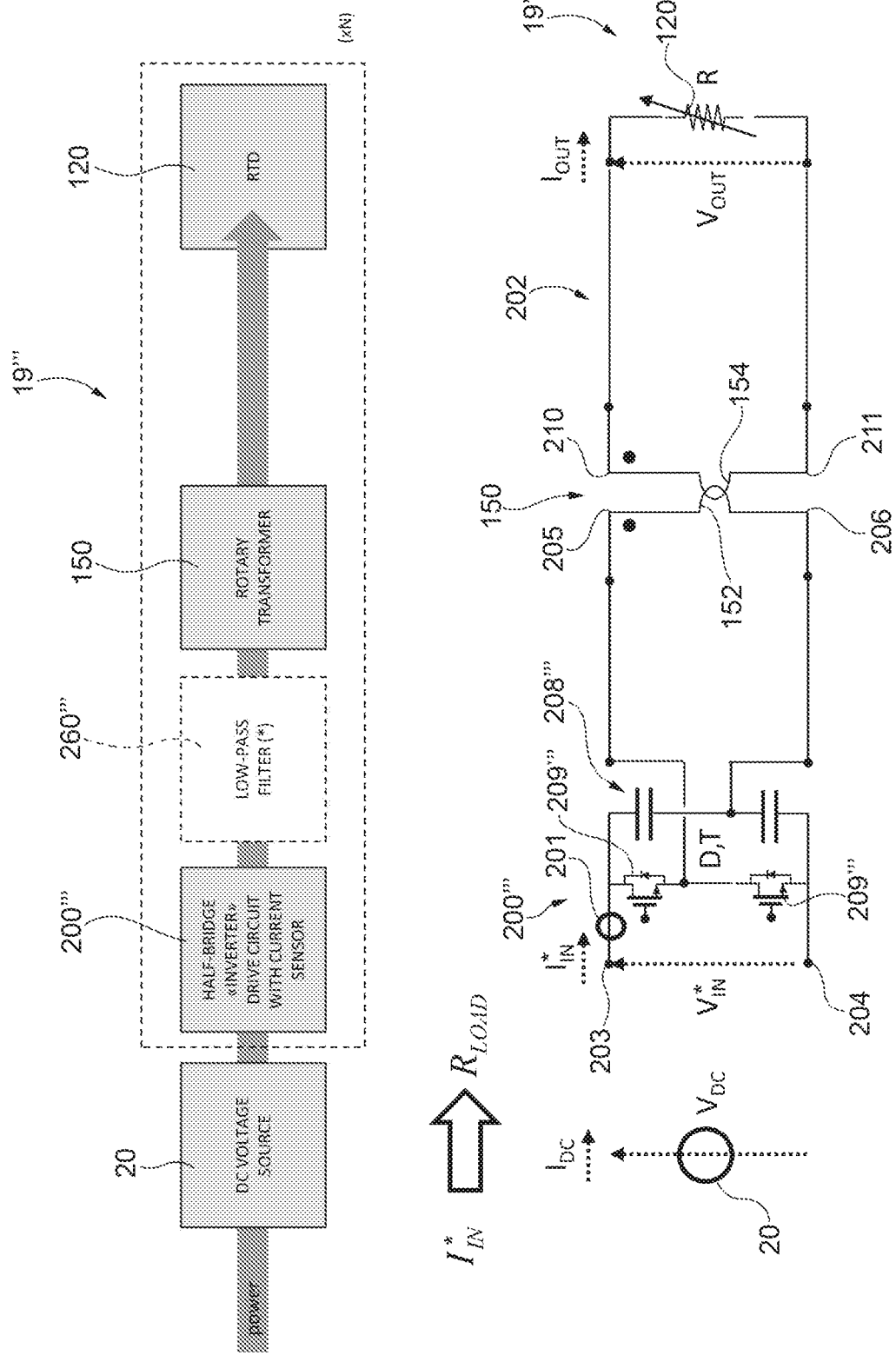

Referring to FIG. 11, reference numeral 19''' indicates a system according to a further embodiment of the invention.

System 19''' is similar to system 19 and will hereinafter be described only with regard to what differentiates it from the latter; the same or equivalent parts of the systems 19, 19''' will be indicated, where possible, by the same reference numerals.

System 19''' differs from system 19 in that each circuit 200''' comprises:

a pair of transistors 209''' interposed between the nodes 203, 204 and 205, 206 that can be driven with constant pulse-width modulation; and a capacitive divider 208'''.

The transistors 209''' define a half-bridge inverter.

The transistors 209''' and the capacitive divider 208''' generate an alternating voltage at nodes 205, 206 of amplitude
$V_{IN}/2$ and with a square waveform.

Preferably, system 19''' comprises a plurality of low-pass filters 260''' (only schematically shown in FIG. 11), each interposed between a respective circuit 200' and the primary winding 152 of the respective transformer 150.

The operation of system 19''' is similar to that of system 19 and is therefore not described in detail.

Figure 12:
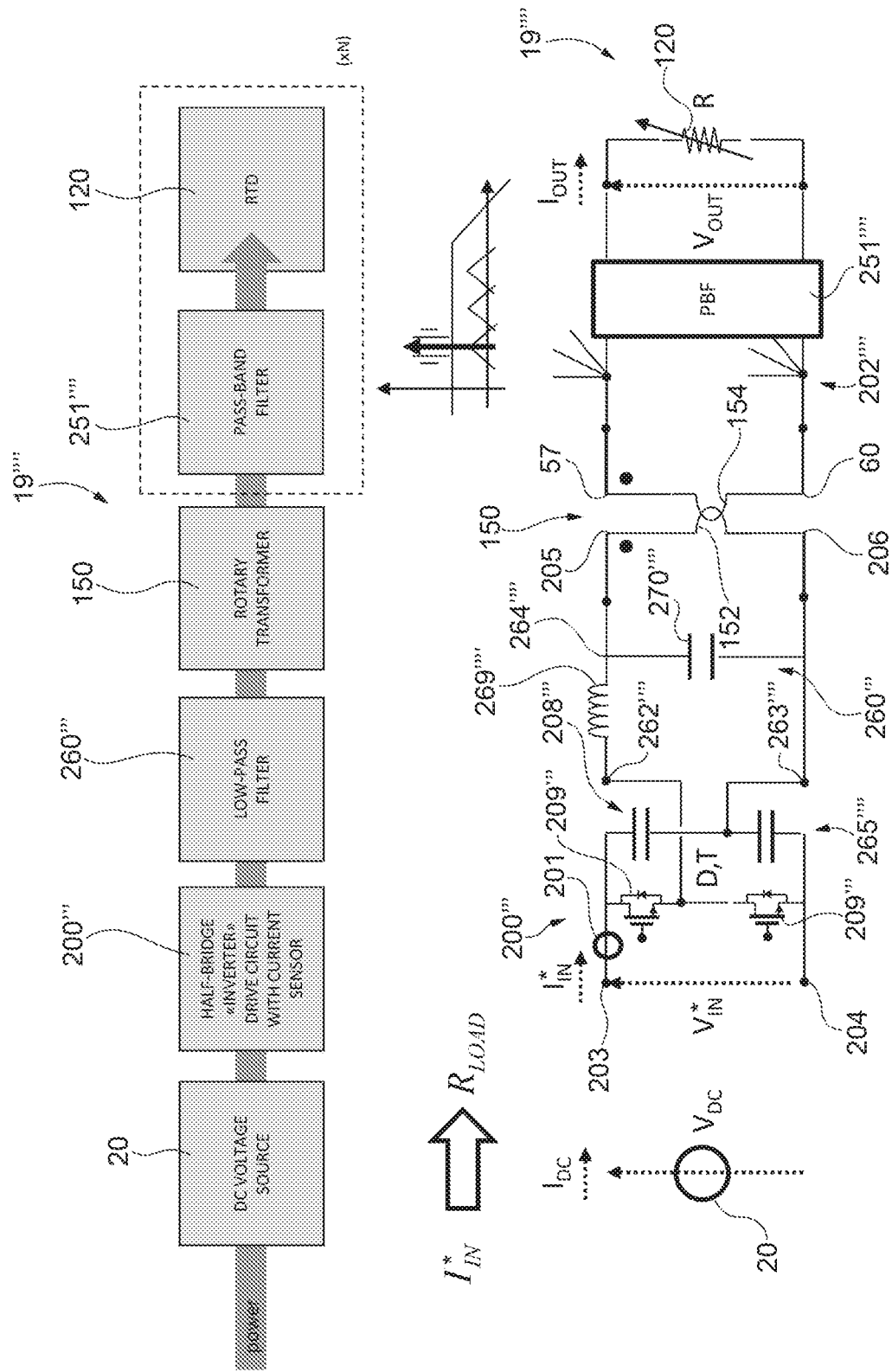

Referring to FIG. 12, reference numeral 19'''' indicates a system according to a further embodiment of the invention.

System 19'''' is similar to system 19''' and will hereinafter be described only with regard to what differentiates it from the latter; the same or equivalent parts of the systems 19''', 19'''' will be indicated, where possible, by the same reference numerals.

System 19'''' differs from system 19''' in that it comprises a single circuit 200''' and a single rotary transformer 150 and in that the circuits 202'''' are electrically connected in parallel to the secondary winding 154 of the rotary transformer 150.

Each circuit 202'''' also comprises a band-pass filter 251''''.

Each band-pass filter 251'''' and the respective sensor 150 are electrically in series with nodes 57, 60 of the respective circuit 202''''.

Preferably, the low-pass filters 251'''' of the circuits 202'''' have respective resonant frequencies different from each other and the switching frequency of the transistors 209'''' of the respective circuits 200'''' is varied so as to correspond to just one of the aforementioned resonant frequencies and consequently activate a single sensor 120 at a time.

In this way, it is possible to use a single rotary transformer 150.

The operation of system 19'''' differs from that of system 19''' in that a single rotary transformer 150 electrically feeds all the circuits 202'''' carried by the respective blades 13.

Furthermore, the switching frequencies of the transistors 209'''' are varied so as to correspond to just one of the aforementioned resonant frequencies and consequently activate a single sensor 124 at a time.

Figure 13:
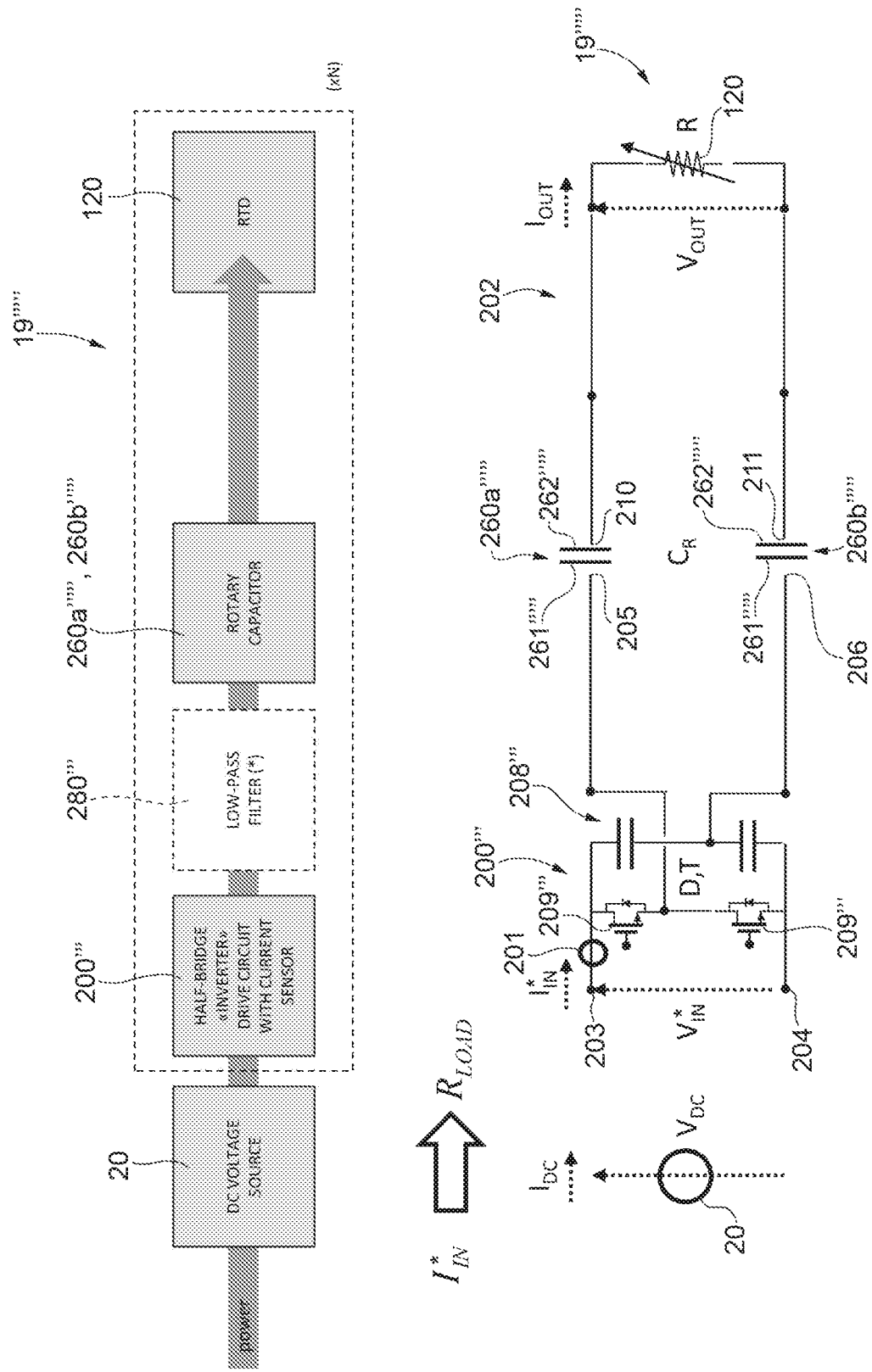

Referring to FIG. 13, reference numeral 19''''' indicates a system according to a further embodiment of the invention.

System 19''''' is similar to system 19'''' and will hereinafter be described only with regard to what differentiates it from the latter; the same or equivalent parts of the systems 19''''', 19'''' will be indicated, where possible, by the same reference numerals.

In particular, system 19''''' differs from system 19'''' in that it comprises, for each blade 13, a pair of respective rotating capacitors 260a''''', 260b''''' instead of the respective rotary transformer 150.

In greater detail, each capacitor 260a''''', 260b''''' is interposed between the respective circuit 200''' and the respective sensor 120.

Each capacitor 260a''''', 260b''''' comprises, in particular:
an armature 261''''' connected in series with the output nodes 264''', 265''' of circuit 200''' and fixed to the casing 9; and
an armature 262''''' carried by the blade 13 and facing the respective armature 261''''', and electrically connected in series with the sensor 120.

The sensor 120 is electrically interposed between the armatures 262'''''.

The operation of system 19''''' differs from system 19'''' in that each circuit 200'''' carried by the casing 9 is electrically coupled to a respective circuit 202'''' carried by the respective blade 13 through a respective pair of capacitors 260a''''', 260b'''''.

Figure 14:
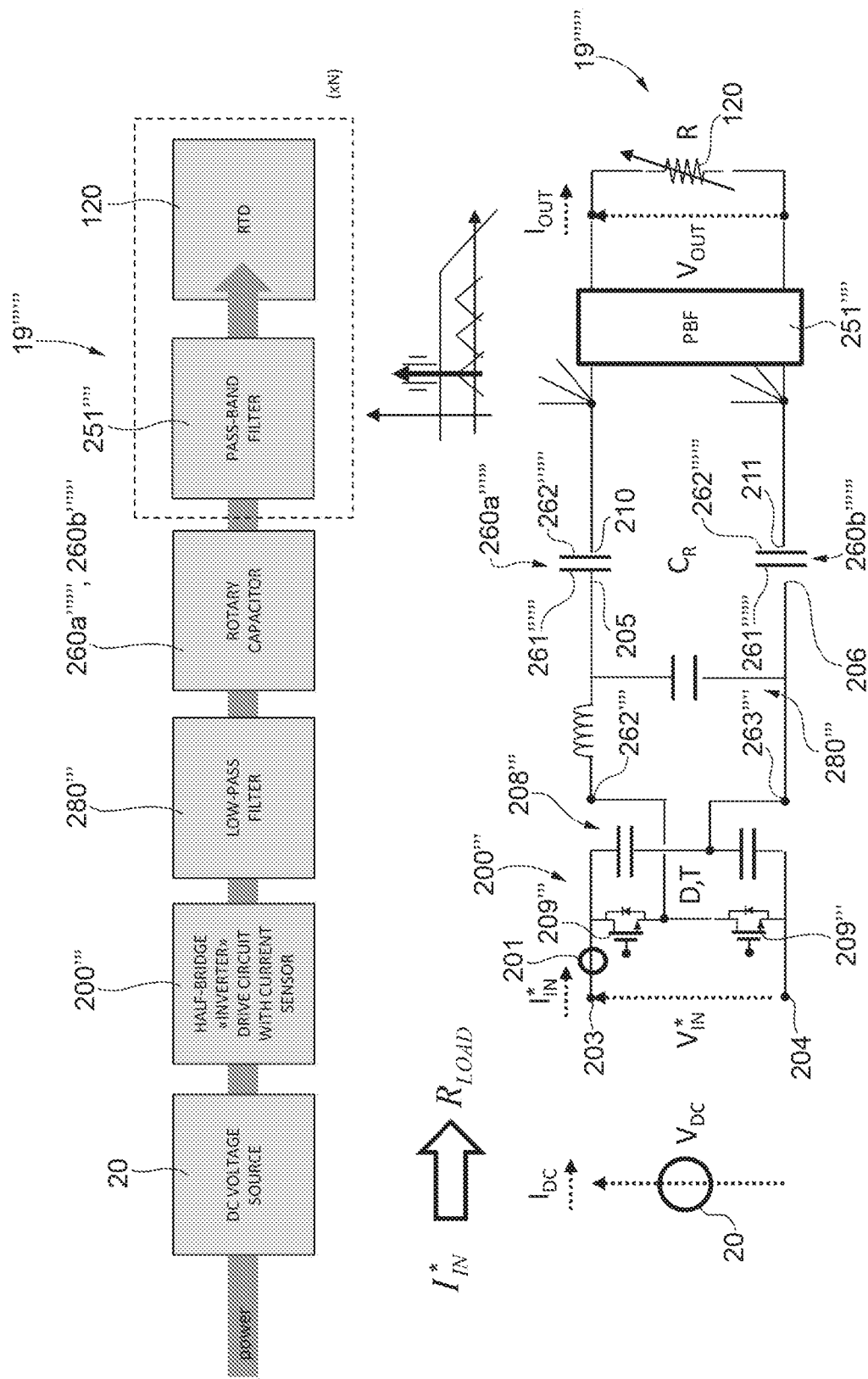

Referring to FIG. 14, reference numeral 19'''''' indicates a system according to a further embodiment of the invention.

System 19'''''' is similar to system 19'''' and will hereinafter be described only with regard to what differentiates it from the latter; the same or equivalent parts of the systems 19'''''', 19'''' will be indicated, where possible, by the same reference numerals.

In particular, the system 19'''''' differs from system 19'''' in that it comprises a single pair of rotating capacitors 260a'''''', 260b'''''' instead of the single rotary transformer 150.

Each rotating capacitor 260a'''''', 260b'''''' comprises, in particular:
an armature 261'''''' fixed to the casing 9; and
an armature 262'''''' carried by the blade 13 and facing the respective armature 261''''''.

The capacitor 260a'''''' comprises the respective armature 261'''''' electrically connected to node 264''''''.

The capacitor 260b'''''' comprises the respective armature 261'''''' electrically connected to node 265''''''.

The armatures 262'''''' are part of circuit 202''''''.

The operation of system 19'''''' differs from the operation of system 19'''' in that the sensors 120 are electrically connected in parallel to the armatures 262'''''' of the rotating capacitors 260a'''''', 260b'''''', in common to all the blades 13.

Figure 15:
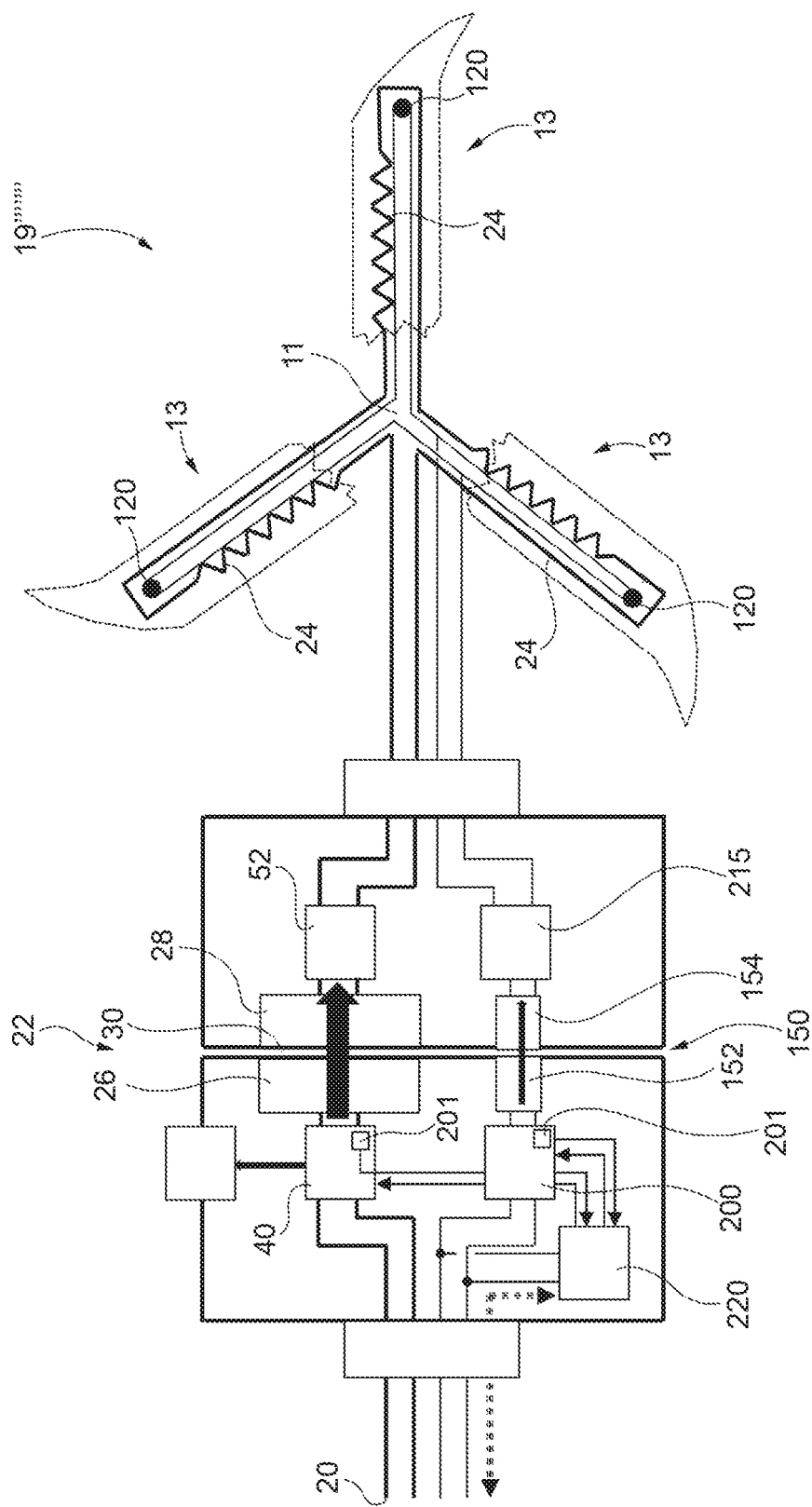
FIG. 15 is a schematic view of the first and second electrical circuits of a further embodiment of the anti-ice/de-icer system of the rotor of the helicopter in FIGS. 2 to 4, with parts removed for the sake of clarity.

Referring to FIG. 15, reference numeral 19''''''' indicates a system according to a further embodiment of the invention.

System 19''''''' is similar to system 19 and will hereinafter be described only with regard to what differentiates it from the latter; the same or equivalent parts of the systems 19''''''', 19 will be indicated, where possible, by the same reference numerals.

System 19''''''' differs from system 19 in that it comprises:
a single driver circuit 40, a single rotary transformer 22 and a single circuit 50 to which all the resistors 24 are connected in series;
a single circuit 200 and a single rotary transformer 150, and a single circuit 202 to which all the sensors 120 are connected in series.

Alternatively, according to an embodiment that is not shown, the system 19''''''' could comprise:
a single circuit 40, 50 and a plurality of circuits 202 to which the respective sensors 120 are connected; or
a single circuit 200 and a plurality of circuits 40, 50 to which the respective resistors 24 are connected.

The operation of system 19''''''' is similar to that of the operation of system 19 and is therefore not described in detail.

From examination of the characteristics of the rotor 3 according to the present invention, the advantages that can be achieved therewith are evident.

In particular, the power supply system 19, 19', 19'', 19''', 19'''', 19''''', 19'''''', 19''''''' comprises a capacitive circuit 50 connected to the transformers 22, so as to reduce the reactive power absorbed from the power source 20.

It is thus possible to energy-optimize the operation of power supply system 19, 19', 19'', 19''', 19'''', 19''''', 19'''''', 19''''''' and, at the same time, reduce the overheating of the rotary transformers 22.

Due to the presence of the inverters defined by the driver circuits 40, it is possible to regulate the frequency f of the alternating supply voltage of the rotary transformers 22. In this way, it is possible to raise this frequency, thereby reducing, for the same geometry and material used, the weight and size of the rotary transformers 22.

In addition, the driver circuits 40 enable using direct voltage generators normally available on board the helicopter 1 to power the transformers 22 with an alternating voltage.

The bearing 105 defines a safety member able to prevent friction between stator 100 and rotor 101, in the event of incorrect positioning of the rotor 101.

In fact, the bearing 105 is normally separated by a radial clearance from the rotor 101 so that the rolling bodies 110 are stationary. In the event of contact with the rotor 101, ring 109 touches the rotor 101 and starts to rotate, substantially eliminating any sliding friction between rotor 101 and stator 100.

Furthermore, circuit 113 becomes electrically closed in the event of contact between rotor 101 and stator 100, signalling the anomalous positioning of the rotor 101.

The stop devices 170 enable axially arresting the rotor 101 in the event it becomes axially movable, through the abutment of the seat 171 of the stator 100 against end 140 of the rotor 101.

Furthermore, electrical circuit 174 becomes electrically closed in the event of axial contact between end 140 and seat 171, signalling the anomalous positioning of the rotor 101.

The power supply systems 19, 19', 19", 19''', 19'''', 19''''', 19'''''', 19''''''' enable measuring the temperature values of the blades 13 by detecting the time trend of the alternating current $I^*_{IN}$, $I_{IN}$ via the sensor 201 arranged on the stator 100. In this way, it is not necessary to place temperature sensors directly on the blades 13 and transfer their respective measurements on board the helicopter 1.

More specifically, the control unit 220 of the power supply system 19" is programmed to measure the temperature of the blades 13 through the measurement of the current Iout that flows in the resistors 24.

Thus, the power supply system 19" does not require sensors 120 for measuring the temperature of the blades 13, resulting particularly simple from the manufacturing standpoint.

The control unit 220 of the power supply systems 19'''', 19''''', 19'''''' comprises a single circuit 200''' defining an inverter of the half-bridge type and a single rotary transformer 150 for powering all the sensors 120.

Furthermore, the power supply systems 19'''', 19''''' comprise respective band-pass filters 251'''' arranged upstream of the respective sensors 120 and having respective pass bands different from one another.

Therefore, by sequentially driving the single inverter 200''' with frequencies sequentially corresponding to the pass bands of the band-pass filters 251'''', it is possible to activate a single sensor 120, and therefore use a single transformer 150 for all the blades 13.

Finally, it is clear that modifications and variants can be made regarding the helicopter 1 described and illustrated herein without departing from the scope defined by the claims.

In particular, the system 19, 19', 19", 19''', 19'''', 19''''', 19'''''' could be implemented on the anti-torque rotor 4.

Furthermore, the system 19, 19', 19", 19''', 19'''', 19''''', 19'''''' could power actuators intended to operate control surfaces of the blades 13 instead of the resistors 24.

The aircraft could be a convertiplane instead of a helicopter.

In particular, each circuit 50 could comprise only branches 51 or only branches 52.

Furthermore, instead of the bearing 105, the rotor 3 could comprise a bushing interposed between stator 100 and rotor 102. In particular, the rotor 3 could comprise a plurality of bushings interposed between stator 100 and rotor 101 to limit friction following an axial or radial contact between the stator 100 and the rotor 101. Alternatively, the rotor 3 could comprise a rolling-contact bearing similar to the bearing 105 and a bushing, one provided to limit friction following axial contact and the other following radial contact between the stator 100 and the rotor 101.

The invention claimed is:

1. A rotor (3, 4) for a hover-capable aircraft (1), comprising:
 a support (9) angularly fixed with respect to an axis (B, C) and housing an electrical power source (20);
 a unit (11, 12) rotatable with respect to said support (9) about said axis (B, C) and housing an electrical load (21, 24) of the resistive type; and
 a power supply system (19, 19', 19", 19''', 19'''', 19''''', 19'''''', 19''''''') adapted to electrically power said electrical load (21, 24); said power supply system (19, 19', 19", 19''', 19'''', 19''''', 19'''''', 19'''''''), in turn, comprising:
 at least a first rotary transformer (22) electrically interposed between said power source (20) and said electrical load (21, 24); said first rotary transformer (22), in turn, comprising:
 a first winding (26) arranged on said support (9), electrically connected to said power source (20) and which can be electrically supplied with an alternating voltage at a frequency value;
 a second winding (28) arranged on said unit (11, 12, 13), electromagnetically coupled to said first winding (26) and electrically connected to said electrical load (21, 24);
 a stator (100) carried by said support (9), rotationally fixed with respect to said axis (B, C) and to which said first winding (26) is fixed; and
 a rotor (101) operatively connected to said unit (11, 12) and to which said second winding (28) is fixed;
 said power supply system (19, 19', 19", 19''', 19'''', 19''''', 19'''''', 19''''''') comprising a capacitive circuit (50) electrically connected to said first rotary transformer (22), so as to reduce the reactive power absorbed by said first rotary transformer (22); characterized in that said stator (100) defines a seat (171) engaged by an appendage (140) of said rotor (101); said seat (171) being engaged with axial play by said appendage (140) when said rotor (101) is correctly positioned with respect to said stator (100); said seat (171) making axial contact with said appendage (140) when said stator (100) is positioned incorrectly in the axial direction.

2. The rotor according to claim 1, characterized in that said capacitive circuit (50) is configured to reduce the overall reactance of said first rotary transformer (22) and the capacitive circuit (50) seen from said power source (20) at said frequency value.

3. The rotor according to claim 1, characterized in that said capacitive circuit (50) comprises:
 a first branch (51) electrically interposed between said power source (20) and said first winding (26) and electrically suppliable with an alternating voltage, and carried by said stator (100); and/or
 at least a second branch (52) electrically interposed between said second winding (28) and said electrical load (21, 24), and carried by said rotor (101).

4. The rotor according to claim 1, characterized in that said seat (171) comprises an electrically insulating element (172) and an electrically conductive element (173) housed inside said electrically insulating element (172) and electrically connected to a second electrical circuit (174);

said second electrical circuit (174) being, in use, electrically open when said appendage (140) is axially set apart from said seat (171);

said second electrical circuit (174) being, in use, electrically closed when said appendage (140) is in contact with said seat (171).

5. The rotor (3, 4) according to claim 1, characterized in that said stator (100) comprises a first magnetic half-core (25) and at least a first slot (102) engaged by the first winding (26);

said rotor (101) comprising a second magnetic half-core (27) and at least a second slot (103) engaged by said second winding (28);

said first and second magnetic half-cores (25, 27) being annularly shaped;

said first magnetic half-core (25) being housed inside said second magnetic half-core (27);

at least one of said first and second magnetic half-cores (25, 27) having a double-C section in a plane parallel to said axis (B, C).

6. The rotor (3, 4) according to claim 1, characterized in that said stator (100) comprises a first main body (119) housing said first winding (26);

said rotor (101) comprising a second main body (130) housing said second winding (28);

said first and second main bodies (119, 130) being hollow and respectively closed on a first and a second side, opposite to each other;

said second main body (130) being partially housed inside said first main body (119).

7. The rotor according to claim 1, characterized in that said first winding (26) is arranged radially internal with respect to said second winding (28);

and/or characterized in that said power supply system (19, 19', 19'', 19''', 19'''', 19''''', 19'''''', 19''''''') comprises support means (105) interposed between said stator (100) and said rotor (101).

8. The rotor according to claim 7, characterized in that said support means (105) comprise a rolling-contact bearing (105) carried by the stator (100);

said rolling-contact bearing (105) comprising:

a first ring (108) carried by said stator (100);

a second ring (109) arranged with a radial clearance with respect to said rotor (101) when the rotor (101) is, in use, correctly positioned with respect to said stator (100); and a plurality of rolling bodies (110) interposed between said first and second rings (108, 109);

said second ring (109) being stationary with respect to said axis (B, C) when said rotor (101) is correctly positioned and radially set apart from said second ring (109);

said second ring (109) cooperating with said rotor (101) when the latter is incorrectly positioned with respect to said stator (100);

said first ring (108) being electrically insulated from said stator (100) and being electrically connected to a first electrical circuit (113);

said first electrical circuit (113) being, in use, electrically open when said stator (100) and said rotor (101) are radially set apart;

said first electrical circuit being, in use, electrically closed when said stator (100) and said rotor (101) are in contact.

9. The rotor according to claim 1, characterized in that said capacitive circuit (50) comprises:

a first node (45) and a second node (44) that can be electrically supplied with an alternating voltage;

a first capacitor (47b) electrically connected between said first node (45) and a third node (46); and a second capacitor (47a) electrically connected between said first node (45) and said second node (44);

said first winding (26) being connected in series between said third node (46) and said second node (44); and/or characterized in that said circuit (50) comprises a third capacitor (54) electrically interposed in series between said second winding (26) and said electrical load (21, 24).

10. The rotor (3, 4) according to claim 9, characterized in that it comprises a plurality of blades (13) housing respective said electrical loads (21, 24);

said power supply system (19'') comprising, for at least said blade (13):

a first inverter (40) electrically connected to said power source (20) and to said first winding (26) of said first rotary transformer (22); said first inverter (40) comprising:

two fourth input nodes (41, 42) that can be supplied with a first value of direct voltage (VIN) and two fifth output nodes (43, 44) at which a second value of alternating voltage is made available; and a first current sensor (201'') arranged at one (41) of said fourth input nodes (41, 42) and adapted to measure a first value of an electric current (IIN) at said one (41) of said fourth input nodes (41, 42);

said power supply system (19'') comprising a control unit (220) programmed to compute the electrical resistance value of said electrical load (24) on the basis of said first value of said electric current (IIN) at said one (41) of said fourth input nodes (41, 42).

11. The rotor according to claim 10, characterized in that said power supply system (19, 19', 19''', 19'''', 19''''', 19'''''', 19''''''') comprises, for each said blade (13):

a second sensor (120) configured to measure a quantity associated with the temperature of the blade (13); and a second inverter (200, 200''') electrically connected to said power source (20);

each said second inverter (200, 200''') comprising two fifth input nodes (203, 204) that can be supplied with a third value of direct voltage ($V^*_{IN}$) and two sixth output nodes (264'''', 265'''') at which a fourth value of alternating voltage is made available; and a third current sensor (201) arranged at one (203) of said fifth input nodes (203, 204) and adapted to measure the second value of an electric current ($I^*_{IN}$) at said one (203) of said fifth input nodes (203, 204);

power supply means (150; 260a'''', 260b''''; 260a''''''; 260b'''''') adapted to electrically supply said second sensor (120) with an alternating voltage ($V_{OUT}$) and electrically connected to said second inverter (200, 200''');

said power supply means (150; 260a'''', 260b''''; 260a''''''; 260b'''''') comprising:

a first electric component (152, 261'''', 262'''''') carried by said stator (100) and which can be electrically supplied with an alternating voltage; and a second electric component (154, 262'''', 262'''''') carried by said rotor (101) and electrically connected to said first electric component (152, 261'''', 262'''''');

said first and second electric components (152, 261'''', 262''''''; 154, 262'''', 262'''''') being physically separated from each other and electrically coupled so as to transfer an alternating voltage from said first electric component (152, 261"", 262"""") to said second electric component (154, 262"", 262""");

said control unit (220) being programmed to compute the electrical resistance value of said second sensor (120) on the basis of said second value of said electric current ($I^*_{IN}$) at said one of said first input nodes (201).

12. The rotor according claim 11, characterized in that said first and second electric components (152, 261"", 262""''; 154, 262"", 262""'') respectively define a third winding (152) and a fourth winding (154) of a respective second rotary transformer (150).

13. The rotor according to claim 12, characterized in that said second inverter (200) comprises, for each said second sensor (120):
- a single transistor (209, 209') driven with a constant or variable duty cycle;
- a seventh and an eighth node (210, 211) between which said second winding (154) is electrically connected in series;
- a diode (215) electrically connected in series between said seventh node (210) and a ninth node (212); and
- a fourth capacitor (214) electrically connected between said ninth node and said eighth node (212, 211);
- said second sensor (120) also being electrically connected in series between said ninth node and said eighth node (212, 211).

14. The rotor according to claim 12, characterized in that it comprises a pair of first electric components (261"", 261""'') and a pair of second electric components (262"", 262""'');
- said first electric components (261"", 261""'') defining respective first armatures of a first and a second capacitor (260a"", 260b"");
- said second electric components (262"", 262""'') defining respective second armatures of said first and second capacitors (260a"", 260b"").

15. The rotor according to claim 12, characterized in that it comprises a single said second inverter (200''') and single said power supply means (150; 260a"", 260b""'') common to all said second sensors (120);
said rotor (101) comprising, for each said second sensor (120):
- a pair of tenth nodes (57, 60) between which said second electric component (154; 262"") are connected in series; and
- a band-pass filter (251"", 251""'') with input power provided by the alternating voltage available at said tenth nodes (57, 60), and electrically interposed between said second electric component (154; 262"") and said second sensor (120);
- said band-pass filters (251"", 251""'') having respective mutually different pass bands;
- said second inverter (200''') making said alternating voltage available at said tenth nodes (57, 60) with frequencies different from each other and each corresponding to said pass band of a respective band-pass filter (251"", 251""'').

16. A rotor (3, 4) for a hover-capable aircraft (1), comprising:
- a support (9) angularly fixed with respect to an axis (B, C) and housing an electrical power source (20);
- a unit (11, 12) rotatable with respect to said support (9) about said axis (B, C) and housing an electrical load (21, 24) of the resistive type; and
- a power supply system (19, 19', 19", 19''', 19"", 19""', 19"""", 19"""") adapted to electrically power said electrical load (21, 24);
said power supply system (19, 19', 19", 19''', 19"", 19""', 19"""", 19""""), in turn, comprising:
- at least a first rotary transformer (22) electrically interposed between said power source (20) and said electrical load (21, 24);
said first rotary transformer (22), in turn, comprising:
- a first winding (26) arranged on said support (9), electrically connected to said power source (20) and which can be electrically supplied with an alternating voltage at a frequency value;
- a second winding (28) arranged on said unit (11, 12, 13), electromagnetically coupled to said first winding (26) and electrically connected to said electrical load (21, 24);
- a stator (100) carried by said support (9), rotationally fixed with respect to said axis (B, C) and to which said first winding (26) is fixed; and
- a rotor (101) operatively connected to said unit (11, 12) and to which said second winding (28) is fixed; said power supply system (19, 19', 19", 19''', 19"", 19""', 19"""", 19"""") comprising a capacitive circuit (50) electrically connected to said first rotary transformer (22), so as to reduce the reactive power absorbed by said first rotary transformer (22);
characterized in that said stator (100) comprises a first magnetic half-core (25) and at least a first slot (102) engaged by the first winding (26);
said rotor (101) comprising a second magnetic half-core (27) and at least a second slot (103) engaged by said second winding (28); said first and second magnetic half-cores (25, 27) being annularly shaped;
said first magnetic half-core (25) being housed inside said second magnetic half-core (27); at least one of said first and second magnetic half-cores (25, 27) having a double-C section in a plane parallel to said axis (B, C).

17. The rotor according to claim 16, characterized in that said capacitive circuit (50) is configured to reduce the overall reactance of said first rotary transformer (22) and the capacitive circuit (50) seen from said power source (20) at said frequency value.

18. The rotor according to claim 16, characterized in that said capacitive circuit (50) comprises:
- a first branch (51) electrically interposed between said power source (20) and said first winding (26) and electrically suppliable with an alternating voltage, and carried by said stator (100); and/or
- at least a second branch (52) electrically interposed between said second winding (28) and said electrical load (21, 24), and carried by said rotor (101).

19. The rotor according to claim 16, characterized in that said capacitive circuit (50) comprises:
- a first node (45) and a second node (44) that can be electrically supplied with an alternating voltage;
- a first capacitor (47b) electrically connected between said first node (45) and a third node (46); and
- a second capacitor (47a) electrically connected between said first node (45) and said second node (44);
- said first winding (26) being connected in series between said third node (46) and said second node (44); and/or
characterized in that said circuit (50) comprises a third capacitor (54) electrically interposed in series between said second winding (26) and said electrical load (21, 24).

20. The rotor according to claim 16, characterized in that said first winding (26) is arranged radially internal with respect to said second winding (28);
and/or characterized in that said power supply system (19, 19', 19", 19''', 19'''', 19''''', 19'''''', 19''''''') comprises support means (105) interposed between said stator (100) and said rotor (101).

21. The rotor according to claim 20, characterized in that said support means (105) comprise a rolling-contact bearing (105) carried by the stator (100);
said rolling-contact bearing (105) comprising:
a first ring (108) carried by said stator (100);
a second ring (109) arranged with a radial clearance with respect to said rotor (101) when the rotor (101) is, in use, correctly positioned with respect to said stator (100); and
a plurality of rolling bodies (110) interposed between said first and second rings (108, 109);
said second ring (109) being stationary with respect to said axis (B, C) when said rotor (101) is correctly positioned and radially set apart from said second ring (109);
said second ring (109) cooperating with said rotor (101) when the latter is incorrectly positioned with respect to said stator (100);
said first ring (108) being electrically insulated from said stator (100) and being electrically connected to a first electrical circuit (113);
said first electrical circuit (113) being, in use, electrically open when said stator (100) and said rotor (101) are radially set apart;
said first electrical circuit being, in use, electrically closed when said stator (100) and said rotor (101) are in contact.

22. The rotor according to claim 16, characterized in that said stator (100) defines a seat (171) engaged by an appendage (140) of said rotor (101);
said seat (171) being engaged with axial play by said appendage (140) when said rotor (101) is correctly positioned with respect to said stator (100);
said seat (171) making axial contact with said appendage (140) when said stator (100) is positioned incorrectly in the axial direction.

23. The rotor according to claim 22, characterized in that said seat (171) comprises an electrically insulating element (172) and an electrically conductive element (173) housed inside said electrically insulating element (172) and electrically connected to a second electrical circuit (174);
said second electrical circuit (174) being, in use, electrically open when said appendage (140) is axially set apart from said seat (171);
said second electrical circuit (174) being, in use, electrically closed when said appendage (140) is in contact with said seat (171).

24. The rotor (3, 4) according to claim 16, characterized in that said stator (100) comprises a first main body (119) housing said first winding (26);
said rotor (101) comprising a second main body (130) housing said second winding (28);
said first and second main bodies (119, 130) being hollow and respectively closed on a first and a second side, opposite to each other;
said second main body (130) being partially housed inside said first main body (119).

25. The rotor according to of claim 24, characterized in that it comprises a plurality of blades (13) housing respective said electrical loads (21, 24);
said power supply system (19") comprising, for at least said blade (13):
a first inverter (40) electrically connected to said power source (20) and to said first winding (26) of said first rotary transformer (22);
said first inverter (40) comprising:
two fourth input nodes (41, 42) that can be supplied with a first value of direct voltage (VIN) and two fifth output nodes (43, 44) at which a second value of alternating voltage is made available; and
a first current sensor (201") arranged at one (41) of said fourth input nodes (41, 42) and adapted to measure a first value of an electric current (IIN) at said one (41) of said fourth input nodes (41, 42);
said power supply system (19") comprising a control unit (220) programmed to compute the electrical resistance value of said electrical load (24) on the basis of said first value of said electric current (IIN) at said one (41) of said fourth input nodes (41, 42).

26. The rotor according to claim 25, characterized in that said power supply system (19, 19', 19''', 19'''', 19''''', 19'''''', 19''''''') comprises, for each said blade (13):
a second sensor (120) configured to measure a quantity associated with the temperature of the blade (13); and
a second inverter (200, 200''') electrically connected to said power source (20);
each said second inverter (200, 200''') comprising two fifth input nodes (203, 204) that can be supplied with a third value of direct voltage ($V^*_{IN}$) and two sixth output nodes (264'''', 265'''') at which a fourth value of alternating voltage is made available; and
a third current sensor (201) arranged at one (203) of said fifth input nodes (203, 204) and adapted to measure the second value of an electric current ($I^*_{IN}$) at said one (203) of said fifth input nodes (203, 204);
power supply means (150; 260a'''', 260b''''; 260a''''''; 260b'''''') adapted to electrically supply said second sensor (120) with an alternating voltage (VouT) and electrically connected to said second inverter (200, 200''');
said power supply means (150; 260a'''', 260b''''; 260a''''''; 260b'''''') comprising:
a first electric component (152, 261'''', 262'''''') carried by said stator (100) and which can be electrically supplied with an alternating voltage; and
a second electric component (154, 262'''', 262'''''') carried by said rotor (101) and electrically connected to said first electric component (152, 261'''', 262'''''');
said first and second electric components (152, 261'''', 262''''''; 154, 262'''', 262'''''') being physically separated from each other and electrically coupled so as to transfer an alternating voltage from said first electric component (152, 261'''', 262'''''') to said second electric component (154, 262'''', 262'''''');
said control unit (220) being programmed to compute the electrical resistance value of said second sensor (120) on the basis of said second value of said electric current ($I^*_{IN}$) at said one of said first input nodes (201).

27. The rotor according to claim 26, characterized in that said first and second electric components (152, 261'''', 262''''''; 154, 262'''', 262'''''') respectively define a third winding (152) and a fourth winding (154) of a respective second rotary transformer (150).

28. The rotor according to claim 27, characterized in that said second inverter (200) comprises, for each said second sensor (120):

a single transistor (209, 209') driven with a constant or variable duty cycle;

a seventh and an eighth node (210, 211) between which said second winding (154) is electrically connected in series;

a diode (215) electrically connected in series between said seventh node (210) and a ninth node (212); and a fourth capacitor (214) electrically connected between said ninth node and said eighth node (212, 211);

said second sensor (120) also being electrically connected in series between said ninth node and said eighth node (212, 211).

29. The rotor according to claim 27, characterized in that it comprises a pair of first electric components (261'''', 261''''') and a pair of second electric components (262'''', 262''''');

said first electric components (261'''', 261''''') defining respective first armatures of a first and a second capacitor (260a'''', 260b'''');

said second electric components (262'''', 262''''') defining respective second armatures of said first and second capacitors (260a'''', 260b'''').

30. The rotor according to claim 27, characterized in that it comprises a single said second inverter (200''') and single said power supply means (150; 260a'''', 260b''''') common to all said second sensors (120);

said rotor (101) comprising, for each said second sensor (120):

a pair of tenth nodes (57, 60) between which said second electric component (154; 262'''') are connected in series; and a band-pass filter (251'''', 251''''') with input power provided by the alternating voltage available at said tenth nodes (57, 60), and electrically interposed between said second electric component (154; 262'''') and said second sensor (120);

said band-pass filters (251'''', 251''''') having respective mutually different pass bands;

said second inverter (200''') making said alternating voltage available at said tenth nodes (57, 60) with frequencies different from each other and each corresponding to said pass band of a respective band-pass filter (251'''', 251''''').

31. A rotor (3, 4) for a hover-capable aircraft (1), comprising:

a support (9) angularly fixed with respect to an axis (B, C) and housing an electrical power source (20);

a unit (11, 12) rotatable with respect to said support (9) about said axis (B, C) and housing an electrical load (21, 24) of the resistive type; and a power supply system (19") adapted to electrically power said electrical load (21, 24);

said power supply system (19"), in turn, comprising:

at least a first rotary transformer (22) electrically interposed between said power source (20) and said electrical load (21, 24);

said first rotary transformer (22), in turn, comprising:

a first winding (26) arranged on said support (9), electrically connected to said power source (20) and which can be electrically supplied with an alternating voltage at a frequency value;

a second winding (28) arranged on said unit (11, 12, 13), electromagnetically coupled to said first winding (26) and electrically connected to said electrical load (21, 24);

a stator (100) carried by said support (9), rotationally fixed with respect to said axis (B, C) and to which said first winding (26) is fixed; and a rotor (101) operatively connected to said unit (11, 12) and to which said second winding (28) is fixed;

said power supply system (19") comprising a capacitive circuit (50) electrically connected to said first rotary transformer (22), so as to reduce the reactive power absorbed by said first rotary transformer (22);

said capacitive circuit (50) comprising:

a first node (45) and a second node (44) that can be electrically supplied with an alternating voltage;

a first capacitor (47b) electrically connected between said first node (45) and a third node (46); and a second capacitor (47a) electrically connected between said first node (45) and said second node (44);

said first winding (26) being connected in series between said third node (46) and said second node (44);

said circuit (50) further comprising a third capacitor (54) electrically interposed in series between said second winding (26) and said electrical load (21, 24);

characterized in that it comprises a plurality of blades (13) housing respective said electrical loads (21, 24);

said power supply system (19") comprising, for at least said blade (13):

a first inverter (40) electrically connected to said power source (20) and to said first winding (26) of said first rotary transformer (22);

said first inverter (40) comprising:

two fourth input nodes (41, 42) that can be supplied with a first value of direct voltage (VIN) and two fifth output nodes (43, 44) at which a second value of alternating voltage is made available; and a first current sensor (201") arranged at one (41) of said fourth input nodes (41, 42) and adapted to measure a first value of an electric current (IIN) at said one (41) of said fourth input nodes (41, 42);

said power supply system (19") comprising a control unit (220) programmed to compute the electrical resistance value of said electrical load (24) on the basis of said first value of said electric current (IIN) at said one (41) of said fourth input nodes (41, 42).

32. The rotor according to claim 31, characterized in that said first winding (26) is arranged radially internal with respect to said second winding (28).

33. The rotor (3, 4) according to claim 31, characterized in that said stator (100) comprises a first magnetic half-core (25) and at least a first slot (102) engaged by the first winding (26); said rotor (101) comprising a second magnetic half-core (27) and at least a second slot (103) engaged by said second winding (28); said first and second magnetic half-cores (25, 27) being annularly shaped; said first magnetic half-core (25) being housed inside said second magnetic half-core (27); at least one of said first and second magnetic half-cores (25, 27) having a double-C section in a plane parallel to said axis (B, C).

34. The rotor (3, 4) according to claim 31, characterized in that said stator (100) comprises a first main body (119) housing said first winding (26); said rotor (101) comprising a second main body (130) housing said second winding (28); said first and second main bodies (119, 130) being hollow and respectively closed on a first and a second side, opposite to each other; said second main body (130) being partially housed inside said first main body (119).

35. The rotor according to claim 31, characterized in that said power supply system (19″) comprises support means (105) interposed between said stator (100) and said rotor (101).

36. The rotor according to claim 35, characterized in that said support means (105) comprise a rolling-contact bearing (105) carried by the stator (100);
said rolling-contact bearing (105) comprising:
a first ring (108) carried by said stator (100);
a second ring (109) arranged with a radial clearance with respect to said rotor (101) when the rotor (101) is, in use, correctly positioned with respect to said stator (100); and
a plurality of rolling bodies (110) interposed between said first and second rings (108, 109);
said second ring (109) being stationary with respect to said axis (B, C) when said rotor (101) is correctly positioned and radially set apart from said second ring (109);
said second ring (109) cooperating with said rotor (101) when the latter is incorrectly positioned with respect to said stator (100);
said first ring (108) being electrically insulated from said stator (100) and being electrically connected to a first electrical circuit (113);
said first electrical circuit (113) being, in use, electrically open when said stator (100) and said rotor (101) are radially set apart;
said first electrical circuit being, in use, electrically closed when said stator (100) and said rotor (101) are in contact.

37. The rotor according to claim 31, characterized in that said stator (100) defines a seat (171) engaged by an appendage (140) of said rotor (101); said seat (171) being engaged with axial play by said appendage (140) when said rotor (101) is correctly positioned with respect to said stator (100); said seat (171) making axial contact with said appendage (140) when said stator (100) is positioned incorrectly in the axial direction.

38. The rotor according to claim 37, characterized in that said seat (171) comprises an electrically insulating element (172) and an electrically conductive element (173) housed inside said electrically insulating element (172) and electrically connected to a second electrical circuit (174);
said second electrical circuit (174) being, in use, electrically open when said appendage (140) is axially set apart from said seat (171);
said second electrical circuit (174) being, in use, electrically closed when said appendage (140) is in contact with said seat (171).

39. The rotor (3, 4) according to claim 31, characterized in that said electrical loads (21, 24) are resistors and are configured to act, in use as temperature sensors for said blades (13).

40. The rotor (3, 4) according to claim 39, characterized in that said control unit (220) is programmed to estimate the temperature of said blades (13) by measuring the resistance of respective said electrical loads (21, 24).

41. The rotor (3, 4) according to claim 39, characterized in that said control unit (220) is programmed to compute the resistance values of said electrical loads (21, 24) on the basis of the waveforms of respective said electrical currents ($I_{in}$) at said one (41) of said fourth input nodes (41, 42), or of the active power at said one (41) of said fourth input nodes (41, 42);
said active power being estimated as the product of said direct voltage ($V_{in}$) and of the mean value of said electrical currents ($I_{in}$).

42. The rotor according to claim 31, characterized in that at least a second branch (52) electrically interposed between said second winding (28) and said electrical load (21, 24), and carried by said rotor (101).

43. The rotor according to claim 42, characterized in that said capacitive circuit (50) is configured to reduce the overall reactance of said first rotary transformer (22) and the capacitive circuit (50) seen from said power source (20) at said frequency value.

44. The rotor according to claim 42, characterized in that said capacitive circuit (50) comprises:
a first branch (51) electrically interposed between said power source (20) and said first winding (26) and electrically suppliable with an alternating voltage, and carried by said stator (100).

* * * * *